(12) United States Patent
Shikama et al.

(10) Patent No.: US 12,061,361 B2
(45) Date of Patent: Aug. 13, 2024

(54) OPTICAL FIBER CONNECTING STRUCTURE

(71) Applicant: Nippon Telegraph and Telephone Corporation, Tokyo (JP)

(72) Inventors: Kota Shikama, Tokyo (JP); Jun Endo, Tokyo (JP); Atsushi Aratake, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 248 days.

(21) Appl. No.: 17/615,417

(22) PCT Filed: Jun. 3, 2019

(86) PCT No.: PCT/JP2019/021947
§ 371 (c)(1),
(2) Date: Nov. 30, 2021

(87) PCT Pub. No.: WO2020/245867
PCT Pub. Date: Dec. 10, 2020

(65) Prior Publication Data
US 2022/0229240 A1 Jul. 21, 2022

(51) Int. Cl.
*G02B 6/36* (2006.01)
*G02B 6/26* (2006.01)
*G02B 7/02* (2021.01)

(52) U.S. Cl.
CPC .......... *G02B 6/3616* (2013.01); *G02B 6/262* (2013.01); *G02B 6/3644* (2013.01); *G02B 7/021* (2013.01)

(58) Field of Classification Search
CPC . G02B 6/262; G02B 6/30; G02B 6/32; G02B 6/3616; G02B 6/3636; G02B 6/364; G02B 6/3644; G02B 6/3648; G02B 6/3652; G02B 7/021
See application file for complete search history.

(56) References Cited

U.S. PATENT DOCUMENTS

| | | | | |
|---|---|---|---|---|
| 4,733,931 A | * | 3/1988 | Fan | G02B 6/3873 385/47 |
| 6,207,950 B1 | | 3/2001 | Verdiell | |
| 6,621,955 B2 | * | 9/2003 | Lin | G02B 6/12004 385/35 |
| 6,839,474 B2 | * | 1/2005 | Steinberg | G02B 6/322 385/14 |
| 2004/0036987 A1 | * | 2/2004 | Wisecarver | G02B 6/3825 359/819 |
| 2011/0255147 A1 | | 10/2011 | Oguri | |

(Continued)

FOREIGN PATENT DOCUMENTS

CN 106383381 A 2/2017
JP H04157406 A 5/1992
(Continued)

*Primary Examiner* — Omar R Rojas
(74) *Attorney, Agent, or Firm* — Slater Matsil, LLP

(57) ABSTRACT

An optical fiber connection structure according to the present invention includes a fiber support member configured to support an optical fiber to be optically connected to an optical waveguide device, a stopper configured to restrict movement in an axial direction of the optical fiber supported by the fiber support member, and a lens disposed on an optical axis between an end surface of the optical waveguide device and the optical fiber.

11 Claims, 19 Drawing Sheets

(56) References Cited

U.S. PATENT DOCUMENTS

2015/0370015 A1\* 12/2015 Aoki ...................... G02B 6/423
  385/14
2018/0372960 A1  12/2018 Wohlfeil

FOREIGN PATENT DOCUMENTS

| JP | 2000121871 A | 4/2000 |
| --- | --- | --- |
| JP | 2002535709 A | 10/2002 |
| JP | 2002357737 A | 12/2002 |
| JP | 2003270482 A | 9/2003 |
| JP | 2004078028 A | 3/2004 |
| JP | 2010156842 A | 7/2010 |
| JP | 201357721 A | 3/2013 |

\* cited by examiner

OPTICAL FIBER CONNECTING STRUCTURE

CROSS-REFERENCE TO RELATED APPLICATIONS

This application is a national phase entry of PCT Application No. PCT/JP2019/021947, filed on Jun. 3, 2019, which application is hereby incorporated herein by reference.

TECHNICAL FIELD

The present invention relates to optical fiber connection structures, and particularly relates to optical fiber connection structures for connecting optical fibers to optical waveguide devices.

BACKGROUND

In recent years, there has been a demand for a significant increase in communication capacity within and between data centers accompanying the increase in traffic consumption by individuals using video services, and the increase in traffic by corporations using the Internet of Things (IoT), cloud services, and the like. To achieve such an increase in communication capacity, an optical interconnection technology using an optical transmission technology or the like used in optical communications has been introduced in place of a conventional short-distance communication method using electric signals.

In a typical method of the optical interconnection, signal processing is implemented by transmission between a light emitting element such as a laser diode (LD) and a light receiving element such as a photo diode (PD) disposed on a printed circuit board, by using optical transmission media such as an optical waveguide and an optical fiber.

In some transmission methods, an optical modulation element and the like are integrated with or discretely connected to a light emitting element, and further a driver for converting electricity to light and the like are connected thereto. A configuration including the above-mentioned light emitting element, optical modulation element, driver, and the like is mounted on a printed circuit board as an optical transmitter. Similarly, an optical processor and the like are appropriately integrated with or discretely connected to a light receiving element, and further an electric amplification circuit for converting light to electricity and the like are connected thereto. A configuration including the above-mentioned light receiving element, optical processor, electric amplification circuit, and the like is mounted on the printed circuit board as an optical receiver.

An optical transceiver obtained by integrating the optical transmitter and the optical receiver, and the like are mounted in a package or on the printed circuit board, and are optically connected to optical transmission media such as an optical fiber, thereby achieving optical interconnection. Further, the optical interconnection is achieved via a repeater such as an optical switch in some topologies.

As the light emitting element, the light receiving element, and the optical modulation element, elements using materials such as semiconductors of silicon, germanium and the like, and group III-V semiconductors represented by indium phosphide (InP), gallium arsenide (GaAs), indium gallium arsenide (InGaAs) and the like, have been put into practical use. In recent years, optical waveguide-type optical transceivers in which, along with the above-described elements, a silicon optical circuit, an indium phosphide optical circuit, and the like having a light propagation mechanism are integrated have been developed. A ferroelectric-based material such as lithium niobate, a polymer material, or the like may be used, in addition to the semiconductors, for the optical modulation element.

Further, an optical functional element including a planar lightwave circuit or the like made of quartz glass or the like may also be integrated along with the light emitting element, the light receiving element, and the optical modulation element. Examples of the optical functional element include a splitter, a wavelength multiplexer/demultiplexer, an optical switch, a polarization control element, and an optical filter. Hereinafter, a device in which the above-described light emitting element, light receiving element, optical modulation element, optical functional element, optical amplification element, and the like having the light propagation and waveguide mechanisms are integrated, is referred to as an "optical waveguide device".

The optical waveguide device is typically connected to an optical fiber array integrated with glass or the like in which V grooves are formed. In this structure, it is required that each core of the optical fibers and a core of a corresponding waveguide of the optical waveguide device be connected with low loss. In order to achieve the connection with low loss, it is necessary for the optical waveguide device and the optical fibers to be positioned (hereinafter, this is referred to as "alignment") with submicron accuracy and fixed to each other. According to the conventional optical waveguide device, light is actually input and output to carry out alignment (optical alignment) while monitoring the power, and the optical waveguide device is mounted in a package, on a board, or the like in a state of being integrated with the optical fiber array. However, the handling of the optical fibers is complicated, and thus it is necessary to align and fix the optical waveguide device and the optical fibers more simply.

A number of methods for simply positioning and fixing an optical waveguide device and optical fibers have been proposed. A representative method of simplification is to change the optical alignment method described above to a method in which alignment is made by mechanical positioning.

As one method for alignment by mechanical positioning, a method is proposed in which an optical fiber guide component having a plurality of guide holes for insertion of optical fibers is aligned with and fixed to an optical waveguide device in advance by optical alignment or the like, and then optical fibers are inserted into the guide holes of the optical fiber guide component and fixed thereto on a board or in a package (see Patent Literature (PTL) 1). As illustrated in FIGS. 17A and 17B, an optical fiber guide component 80 described in PTL 1 is constituted by a V groove substrate 801, in which a plurality of V grooves 801*a* are formed, dummy optical fibers 60*a* disposed in two V grooves on both sides of the plurality of V grooves 801*a*, and a lid 802 formed in a flat plate shape and integrated with the V groove substrate 801 by using an adhesive layer 803.

As illustrated in a plan view of FIG. 17A and a cross-sectional view of FIG. 17B, the optical fiber guide component 80 is integrated with an optical waveguide device 7 by using an adhesive 82 or the like. The optical waveguide device 7 includes a waveguide substrate 71 and an optical waveguide layer 72 formed on the waveguide substrate 71, and the optical waveguide layer 72 includes a clad 722 formed on the waveguide substrate 71 and a core 721 formed inside the clad 722. An optical fiber 60 is fixed to a plug 61. A connector receptacle (not illustrated) is fixed to the optical fiber guide component 80. When the plug 61 is inserted into and fitted to the connector receptacle, the optical fiber 60 is inserted into a guide hole 81 formed by the V groove 801a of the V groove substrate 801 and the lid 802 of the optical fiber guide component 80, and is positioned. Then, an end surface of the optical fiber 60 is brought into contact with an end surface of the core 721 of the optical waveguide device 7. Thus, the optical fiber 60 and the core 721 of the optical waveguide device 7 are optically connected to each other. To reinforce the adhesion between the optical waveguide device 7 and the optical fiber guide component 80, a reinforcement plate 11 made of glass is pasted onto the optical waveguide device 7.

The guide hole 81 and guide holes 81a of the optical fiber guide component 80 are formed by the V grooves 801a and the lid 802, and the diameter of the guide holes is determined by the diameter of the dummy optical fibers 60a disposed in the two V grooves 801a on both sides. In order to allow the insertion of the optical fiber 60 into the guide hole, the guide hole is set to have a slightly larger diameter than the optical fiber 60. When a difference in diameter between the guide hole and the optical fiber 60 is defined as clearance, a submicron level of clearance is required. In other words, the diameter of the dummy optical fiber 60a is set to be larger than the diameter of the optical fiber 60.

However, in the technique described above, since a step of manufacturing the optical fiber guide component 80 with high accuracy in advance, and a step of optically aligning, bonding, and fixing the optical fiber guide component 80 onto the optical waveguide device 7 with high accuracy are required, it cannot be said that the work to form the optical fiber connection structure is satisfactorily simplified. In addition, in the configuration described above, the guide hole 81 must have an inner diameter larger than the outer diameter of the optical fiber 60, and the clearance accompanying the difference in the diameters thereof, that is, the difference between the inner diameter of the guide hole and the outer diameter of the optical fiber causes connection loss to increase.

CITATION LIST

Patent Literature

PTL 1: JP 2004-078028 A

SUMMARY

Technical Problem

Embodiments of the present invention have been conceived to solve the problems described above, and an object of embodiments of the present invention is to provide an optical fiber connection structure able to achieve an optical connection with low loss between an optical waveguide device and an optical fiber while simply forming the optical fiber connection structure.

Means for Solving the Problem

In order to accomplish the object described above, an optical fiber connection structure (1) according to embodiments of the present invention includes a fiber support member (101) configured to support an optical fiber to be optically connected to an optical waveguide device; a stopper (102) configured to restrict movement in an axial direction of the optical fiber supported by the fiber support member; and a lens (103a, 103b) disposed on an optical axis between an end surface of the optical waveguide device and the optical fiber.

As a configuration example of the optical fiber connection structure according to embodiments of the present invention, the fiber support member (101) may include a connection portion (101a) configured to connect to the end surface of the optical waveguide device, and a guide portion (101b) configured to guide the optical fiber; and the stopper (102) and the lens (103a, 103b) may be provided on the connection portion (101a).

As a configuration example of the optical fiber connection structure according to embodiments of the present invention, there may be further included a lens support member (401, 411) configured to connect to a waveguide substrate of the optical waveguide device and configured to support the lens, where the fiber support member may include the connection portion (101a) configured to connect to the end surface of the optical waveguide device and the guide portion (101b) configured to guide the optical fiber, the lens (403a, 403b) may be supported by the lens support member (401), and the stopper (102, 412) may be provided on any of the connection portion (101a) and the lens support member (411).

As a configuration example of the optical fiber connection structure according to embodiments of the present invention, the guide portion (212) may form a guide hole (H) into which the optical fiber is inserted, and the center of an inscribed circle (C3) of the guide hole may be coincident with an optical axis of the lens (103c).

As a configuration example of the optical fiber connection structure according to embodiments of the present invention, the guide portion (50) may be formed of an elastically deformable material, and an inscribed circle (C4) of the guide hole may be set to be smaller than an outer diameter of the optical fiber to be inserted, in at least one region in a longitudinal direction of the guide hole.

As a configuration example of the optical fiber connection structure according to embodiments of the present invention, the fiber support member (101) may include a lens housing (S) inside which the lens is housed and a portion of which to be connected to the end surface of the optical waveguide device is open; and the lens (103a, 103b) may be provided inside the lens housing.

As a configuration example of the optical fiber connection structure according to embodiments of the present invention, the lens may be one of a plurality of lenses (103a, 103b) configured to constitute any of a single-lens system, a two-lens system, and a four-lens system; and a layer having a refractive index lower than a refractive index of the plurality of lenses may be provided, at least, between the end surface of the optical waveguide device (7) and a lens (103a), among the plurality of lenses, facing the end surface of the optical waveguide device, and between the optical fiber (60) and a lens (103b), among the plurality of lenses, facing an end surface of the optical fiber.

As a configuration example of the optical fiber connection structure according to embodiments of the present invention, the lens may be a plurality of lenses (303a, 303b) configured to constitute a two-lens system; a first lens (303a) and a second lens (303b) configured to constitute the two-lens system are configured to connect to the end surface of the optical waveguide device (7) and the end surface of the optical fiber (60), respectively, via no air layer; and a layer having a refractive index lower than the refractive index of the plurality of lenses may be provided between the first lens and the second lens.

Effects of Embodiments of the Invention

According to embodiments of the present invention, an optical connection with low loss between an optical waveguide device and an optical fiber may be achieved while simply forming an optical fiber connection structure for connecting the optical waveguide device and the optical fiber.

DETAILED DESCRIPTION OF ILLUSTRATIVE EMBODIMENTS

Figure 1A:
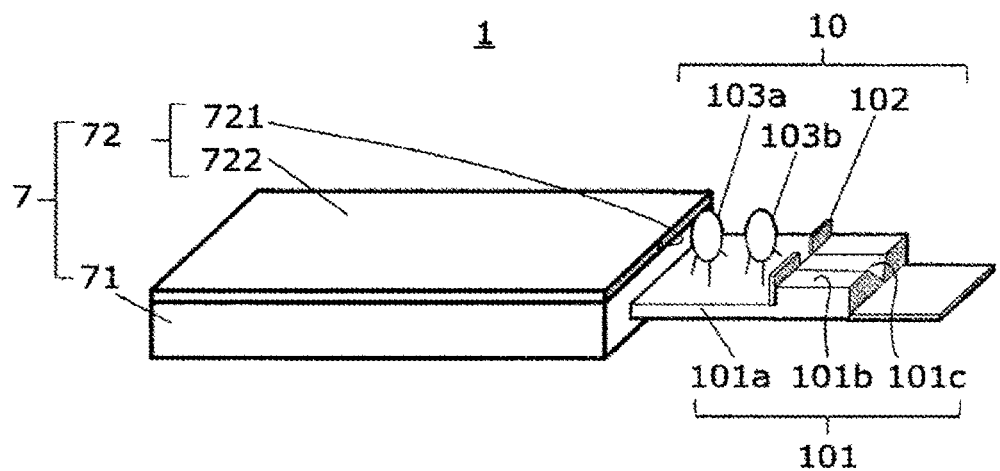
FIG. 1A is a perspective view schematically illustrating an optical fiber connection structure according to a first embodiment of the present invention.
Figure 1B:
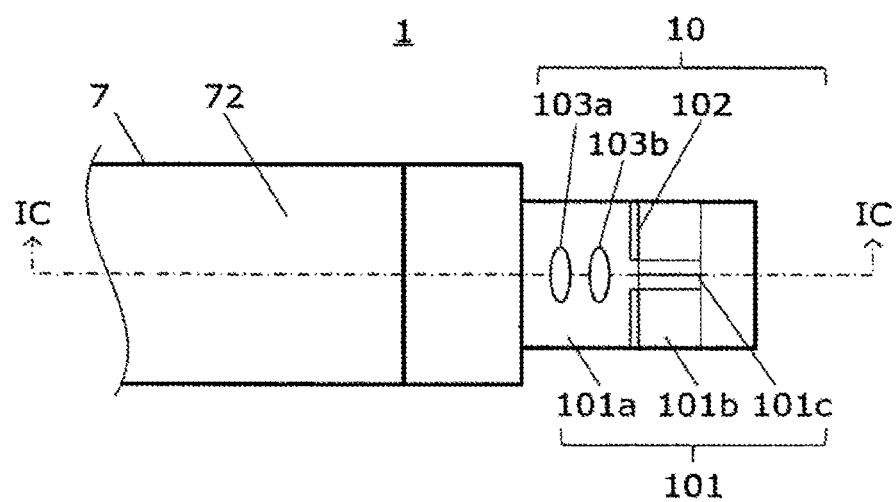
FIG. 1B is a top view schematically illustrating an optical fiber connection structure according to the first embodiment of the present invention.
Figure 1C:
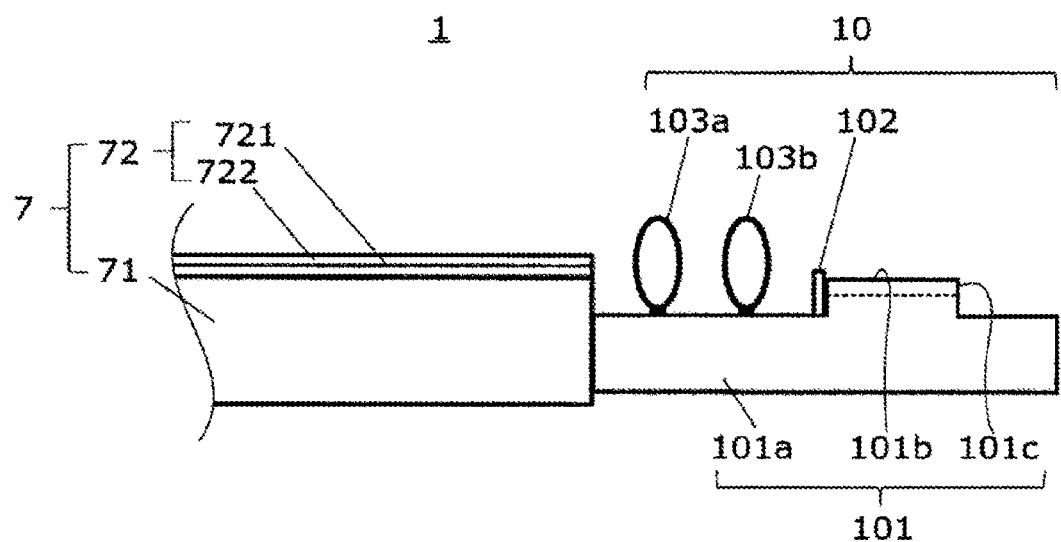
FIG. 1C is a side cross-sectional view illustrating a cross section taken along a line IC-IC in FIG. 1B.

Hereinafter, embodiments of the present invention will be described with reference to the drawings.

First Embodiment

An optical fiber connection structure according to a first embodiment of the present invention will be described with reference to FIGS. 1A to 1D and FIGS. 2 to 4.

An optical fiber connection structure 1 according to the first embodiment of the present invention is an optical fiber connection structure provided with an optical fiber guide structure 10 that optically connects an optical waveguide device 7 and an optical fiber 60 to each other.

As illustrated in FIGS. 1A to 1D, the optical fiber guide structure 10 includes a fiber support member 101, a stopper 102, and lenses 103a and 103b. The fiber support member 101 supports the optical fiber 60 to be optically connected to the optical waveguide device 7 formed in a plate shape. The stopper 102 restricts the movement in an axial direction of the optical fiber 60 supported by the fiber support member 101. The lenses 103a and 103b are disposed on an optical axis between an end surface of the optical waveguide device 7 and the optical fiber 60.

As described below, in the first embodiment, the optical fiber guide structure 10 including the fiber support member 101, the stopper 102, and the lenses 103a, 103b described above is formed of a light curing resin.

The fiber support member 101 includes a connection portion 101a to be connected to the end surface of the optical waveguide device 7, and a guide portion 101b that guides the optical fiber 60.

One end of the connection portion 101a of the fiber support member 101 is joined to the end surface of the optical waveguide device 7, and the guide portion 101b is integrally formed to the other end thereof. In the first embodiment, other members, namely, the stopper 102 and the lenses 103a, 103b are provided on the connection portion 101a of the fiber support member 101.

On the other hand, the guide portion 101b is, for example, a cuboid pedestal formed continuously with the connection portion 101a, and includes a groove 101c on the top surface thereof capable of accommodating the cylindrical optical fiber 60. In the first embodiment, the groove 101c is formed to include a V groove, the cross section of which perpendicular to the longitudinal direction has a "V" letter shape. However, a groove with a known structure, other than the V groove, capable of positioning the fiber, for example, a groove of any shape such as a rectangular groove, a U-shaped groove, or a groove with a ridge structure may be applied because it is only required that the groove be capable of accommodating the fiber 60.

The stopper 102 is formed in a plate shape as a stopper structure configured to restrict the movement in the axial direction of the optical fiber 60 supported by the fiber support member 101, and is provided adjacent to the guide portion 101b near the V groove on the side of the guide portion 101b facing the optical waveguide device 7. A distance between the end surface of the fiber 60 and the lens 103b can be uniquely determined with the stopper 102 when the optical fiber 60 is mounted on the guide portion 101b of the fiber support member 101.

In the first embodiment, a lens structure including two lenses 103a and 103b each having a biconvex shape is formed on the fiber support member 101.

The positional relationship among a core 721 at the connection end surface of the optical waveguide device 7, the two lenses 103a and 103b, and the core of the end surface of the optical fiber 60 mounted on the fiber support member 101 is appropriately arranged in accordance with optical requirements including relative positions of the lens centers of the two lenses 103a and 103b, a distance between the lenses, and a distance between the core end surface of the optical waveguide device 7 and the lenses. For example, by setting the lens shapes and lens positions so as to convert light to predetermined collimated light by the first lens and collect the collimated light into a predetermined spot-size beam by the second lens in accordance with the spot system of the fiber, it is possible to achieve a connection with low loss while matching the mode fields of the waveguide device and the optical fiber. The lens shape may employ a nonlinear shape, a Fresnel lens shape, or the like as necessary.

Figure 1D:
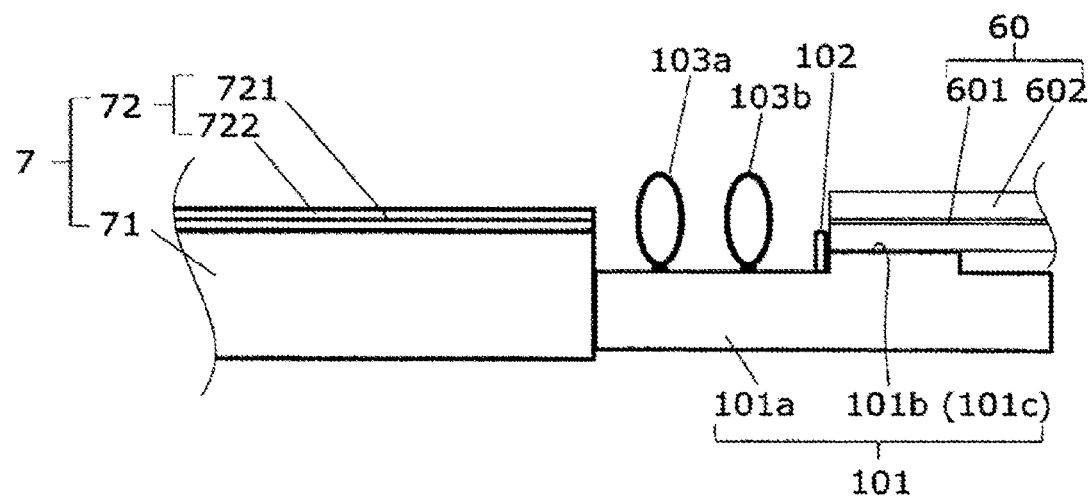
FIG. 1D is a side cross-sectional view schematically illustrating an optical fiber connection structure according to the first embodiment of the present invention.

FIG. 1D illustrates a state in which the optical fiber 60 is mounted in the optical fiber connection structure 1 according to the embodiment. As illustrated in FIG. 1D, the position of a core 601 of the optical fiber 60 is uniquely determined by the optical fiber 60 being accommodated in the V groove low and an end surface of a clad 602 in the end surface of the optical fiber 60 being brought into contact with the stopper 102.

Once the position of the optical fiber 60 is determined, the optical fiber 60 may be fixed on the fiber support member 101 using an adhesive (not illustrated), a reinforcement structure (not illustrated), or the like as needed.

Since the beam diameters of the input/output beams from the core 721 of the optical waveguide device 7 and the core 601 of the optical fiber 60 expand as the input/output beams travel away from the respective end surfaces, the effective diameter of the lens is made to be a diameter necessary to prevent the occurrence of beam vignetting. Furthermore, the structure is designed so that there occurs no beam vignetting caused by the support substrate, surrounding structural objects, and the like.

As described above, the positions of the groove low in which the optical fiber 60 is to be mounted and the stopper 102, the positions of the lenses 103a and 103b, and the like are uniquely formed in such a manner as to achieve the connection with low loss.

On the other hand, the optical waveguide device 7 is a device including an optical waveguide layer 72 using, for example, a thin silicon wire as the core 721. This may be manufactured using a well-known silicon on insulator (SOI) substrate and the like. A surface silicon layer of an SOI substrate is patterned by known photolithography and etching techniques, and the like, so as to form a core layer that constitutes the optical waveguide (optical circuit). Next, for example, silicon oxide is deposited by a well-known deposition method such as plasma CVD to form an upper clad layer. This makes it possible to form the optical waveguide in which a buried insulating layer is made to be a lower clad layer, and the core layer made of the thin silicon wire and formed on the lower clad layer is covered with the upper clad layer. The optical waveguide device 7 may, for example, be a planar lightwave circuit made of a quartz glass thin film formed through deposition on a silicon substrate. The present invention is not limited thereto as long as the device is an optical waveguide device having a waveguide mechanism. For example, as the substrate, the optical waveguide, or the like, in addition to quartz glass, a resin formed of organic material, a semiconductor or compound semiconductor waveguide of Si, silicon nitride (SiN), gallium arsenide, indium phosphorus (InP) or the like, and a dielectric such as lithium niobate (LN) and periodically poled lithium niobate (PPLN) may be used.

In the optical waveguide device 7, various signal processing optical circuits for processing signals, and various optical functional elements for light emission, light reception, modulation, control, and the like may be integrated. In addition, optional optical functional elements such as an isolator, polarization rotation, a polarization separation element, and an optical attenuator may be integrated.

In the present embodiment, in the optical waveguide device 7, a connection end surface where one end of the core 721 of the optical waveguide layer 72 to be optically connected with the optical fiber 60 appears plays a meaningful role, and the optical fiber connection structure is not affected by other circuit configurations and circuit functions.

Next, a manufacturing method for the optical fiber guide structure 10 in the optical fiber connection structure 1 according to the present embodiment will be described.

As a first method, a film of a photoresist is first formed on the connection end surface of the optical waveguide device 7 by applying a photoresist represented by an ultraviolet (UV) curing resin, SU8, and the like. Instead of applying the photoresist, the connection end surface of the optical waveguide device 7 may be put into a container filled with the photoresist to form a film of a photoresist.

Next, UV light emitted from a laser is collected and radiated onto the photoresist film via a predetermined optical system. At this time, the position to be irradiated with the UV light is scanned to form a structural body made of any desired light curing resin. Since the photoresist irradiated with UV light is light-cured, by scanning the position to be irradiated with the UV light, the resin is cured along the scanning trajectory, thereby making it possible to form the optical fiber guide structure 10. As for the UV light, for example, a light source and an optical system may be caused to perform scanning by using a motor, a piezo stage, or the like, or using a galvano-mirror, a deflection element, or the like.

As a second method, there is a method in which stereolithography is performed by using a femtosecond laser, as a laser, having a wavelength longer than the wavelength at which the light curing resin is cured. In this method, two-photon absorption of the wavelength at which the resin is cured due to a nonlinear effect is generated at a location where light has a constant light intensity by being collected. The light collecting location where the two-photon absorption is generated is scanned in a similar manner to the first method described above, thereby forming the optical fiber guide structure 10. This method, as is well-known, makes it possible to perform high-accuracy and nano-level stereolithography. As described above, when the resin in the uncured region is removed after the resin is shaped by light curing, a three-dimensional structural object can be formed.

Modification Example of First Embodiment

As discussed above, as the optical fiber connection structure according to the first embodiment, one optical fiber connection structure 1 corresponding to one optical fiber 60 is exemplified and described, as illustrated in FIGS. 1A to 1D. However, the present invention is not limited to the guide structure and the numbers described above.

Figure 2:
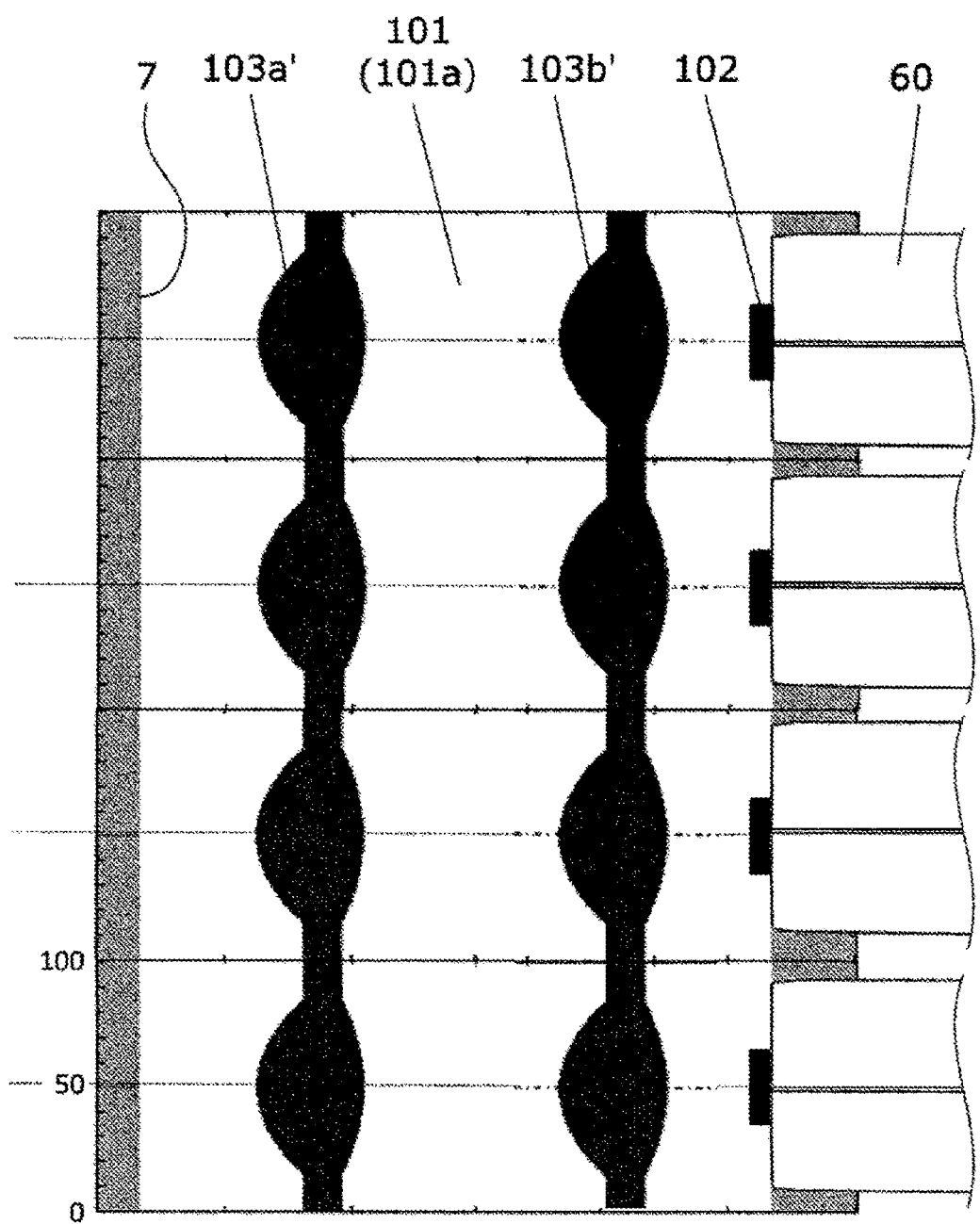
FIG. 2 is a top view illustrating a first modification example of an optical fiber connection structure according to the first embodiment of the present invention.

For example, as illustrated in FIG. 2, an array structure may be employed in which the above-described optical fiber guide structure 10 is suitably provided in a plurality in accordance with the number of cores present on the connection end surface of the optical waveguide device 7. By employing the array structure as illustrated in FIG. 2, and mounting a plurality of optical fibers in the array structure, it is possible to collectively achieve connections with an optical waveguide device including a plurality of cores. When manufacturing an optical fiber guide structure of the above-mentioned array structure, a plurality of independent optical fiber guide structures 10 may be formed for each of the corresponding cores, or a structure integrally including a plurality of optical fiber guide structures may be formed.

In the first embodiment, since a structural body made of a light curing resin is formed directly on the optical waveguide device, it is necessary to sufficiently ensure a joining strength between the resin and the connection end surface of the optical waveguide device 7. For this purpose, the joining strength may be enhanced by setting the outer periphery of the optical fiber guide structure 10 to be suitably large to widen the joining area.

In embodiments of the present invention, the distance of the lens, the position of the lens, the shape of the lens, and the like may be appropriately designed in accordance with connection targets such as a mode field of the optical waveguide device, a mode field of the optical fiber, and the like.

Figure 3:
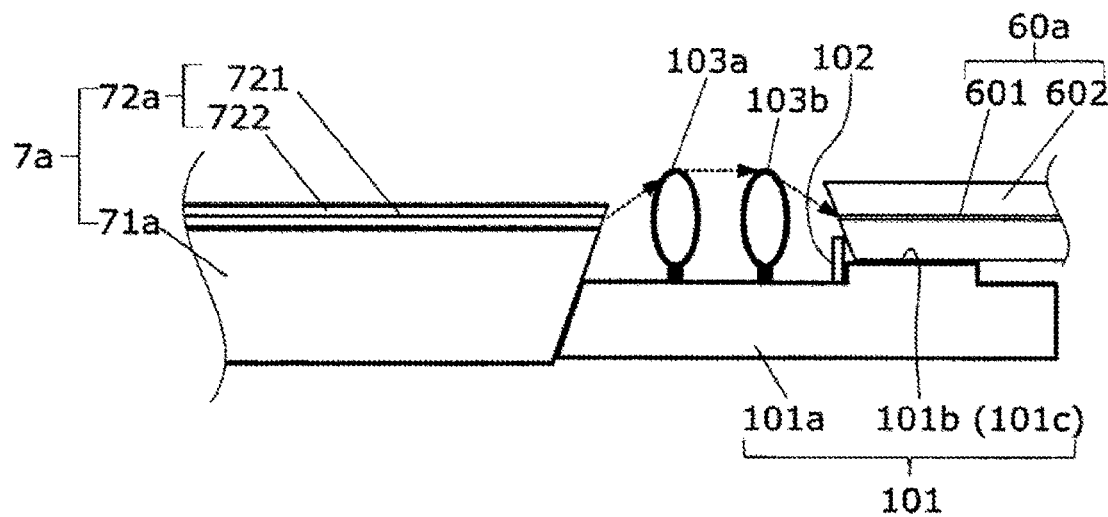
FIG. 3 is a side cross-sectional view illustrating a second modification example of an optical fiber connection structure according to the first embodiment of the present invention.

For example, as illustrated in FIG. 3, even when a connection end surface of an optical waveguide device 7a and an end surface of an optical fiber 60a are inclined with respect to the optical axis, a connection with low loss can be achieved by appropriately designing the position of the lens.

In FIG. 3, an example is illustrated in which the connection end surface of the optical waveguide device 7a and the end surface of the optical fiber 60a are each inclined in a substrate end surface direction (inclined in an up and down direction in the paper surface in FIG. 3), but they may be inclined in an in-plane direction of the waveguide layer (inclined in a front and rear direction with respect to the paper surface). Further, the waveguide layout may be designed in such a manner that an optical axis of the core 721 of the optical waveguide device 7 is inclined with respect to the connection end surface of the optical waveguide device 7. By doing so, it is possible to reduce returning reflection light.

Figure 4:
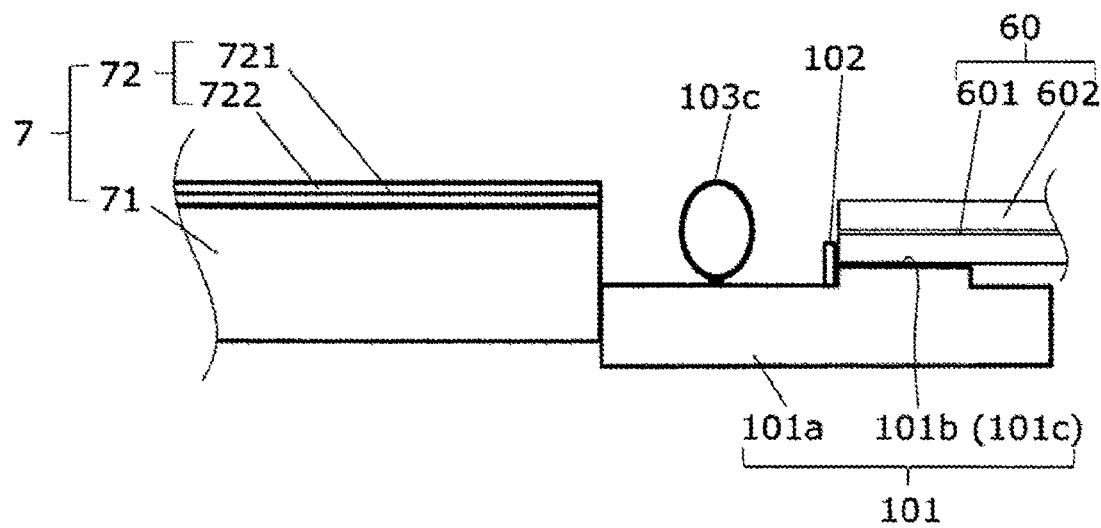
FIG. 4 is a side cross-sectional view illustrating a third modification example of an optical fiber connection structure according to the first embodiment of the present invention.

As the optical fiber connection structure according to the first embodiment, an example in which two lenses are provided is illustrated above. However, as another modification example, by providing one biconvex lens 103c, as illustrated in FIG. 4, the same effects as those of the optical fiber connection structure 1 according to the first embodiment may also be obtained. At the time of configuring the lens system, a four-lens system, a one-side convex lens, a concave lens, and the like may be appropriately combined. Furthermore, various functional elements such as a wavelength plate may be integrated between two lenses.

An anti-reflective film (not illustrated) may be formed on the waveguide end surface, the lens end surface, and the optical fiber end surface, or an anti-reflective structure (not illustrated) such as a quarter wavelength plate may be provided. By forming an anti-reflective film or the like, loss due to reflection may also be reduced.

By causing the space between the lenses 103a, 103b and 103c, and the end surfaces of the waveguide device 7 and the optical fiber 60 to be an air layer, it is possible to obtain sufficient refractive power as an optical fiber connection structure by generating a difference in refractive index from a lens made of a light curing resin, but a resin with a lower refractive index or the like may be filled as necessary.

In the present embodiment, in order to match the center of a circle corresponding to the core 601 of the optical fiber 60 and the core 721 of the optical waveguide device 7 when forming the optical fiber guide structure 10, for example, constituent elements of the optical fiber connection structure may be formed with reference to the waveguide core 721, which is a subject detected by using a camera monitor with high accuracy when forming a molding object.

Effects of First Embodiment

In the optical fiber connection structure according to the first embodiment, the optical fiber connection structure for connecting the optical waveguide device 7 and the optical fiber 60 is directly formed on the optical waveguide end surface of the optical waveguide device 7 in a simplified manner. Thus, a highly accurate fiber guide structure with submicron accuracy may be formed by being drawn directly on the optical waveguide end surface. Furthermore, the optical fiber connection structure 1 may be used as a guide to position the optical fiber 60 and the optical axis, thereby making it possible for the fiber to be connected on the board, in the package, or the like with ease.

The lens structure constituted by the lenses 103a and 103b allows the optical waveguide device 7 and the optical fiber 60 to be connected to each other while converting the beam diameters to match the mode fields. Furthermore, converting the beam diameter of each of the core 721 of the optical waveguide device 7 and the core 601 of the optical fiber 60 via the lenses makes it possible to achieve connection without causing an optically large loss, even in a case where there is a positional deviation due to the clearance, which is conventionally considered problematic. That is, an optical connection with low loss and high axial-deviation tolerance between the optical waveguide device and the optical fiber can be achieved.

Second Embodiment

Next, an optical fiber connection structure according to a second embodiment of the present invention will be described with reference to FIGS. 5A to 5E. Note that the same reference signs are used for the constituent elements common to the optical fiber connection structure according to the first embodiment, and detailed descriptions thereof will be omitted.

An optical fiber connection structure 2 according to the second embodiment further includes a reinforcement plate 11, a support structure, and a plate member 202, in addition to the configuration of the optical fiber connection structure 1 according to the first embodiment described above. The reinforcement plate 11 is provided on the optical waveguide layer 72 of the optical waveguide device 7. The support structure is formed of plate members 201, 203R, and 203L. The plate member 202 is mounted on the guide portion 101b of the fiber support member 101.

Of these constituent elements, the reinforcement plate 11 is provided at a position near the connection end surface on the optical waveguide layer 72 of the optical waveguide device 7 in order to reinforce the adhesion between the optical waveguide device 7 and the connection portion 101a of the fiber support member 101. The reinforcement plate 11 may be formed using any material such as glass, ceramics, metal, or the like. Metal joining or the like, other than the adhesion, may be used for the method of fixing the reinforcement plate 11 onto the optical waveguide layer 72. One side surface of the reinforcement plate 11 is fixed to be flush with the connection end surface of the optical waveguide device 7. To be flush with the above connection end surface, the reinforcement plate 11 may be fixed with a mechanical jig or the like, and dicing, polishing, or the like may be performed as necessary after fixing the reinforcement plate 11 onto the optical waveguide device 7.

Figure 5A:
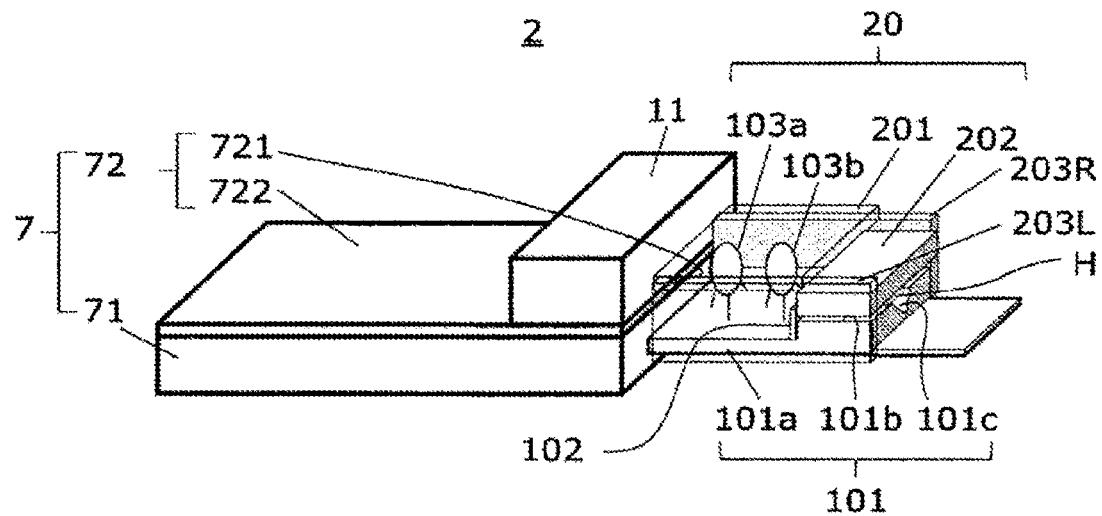
FIG. 5A is a perspective view schematically illustrating an optical fiber connection structure according to a second embodiment of the present invention.
Figure 5B:
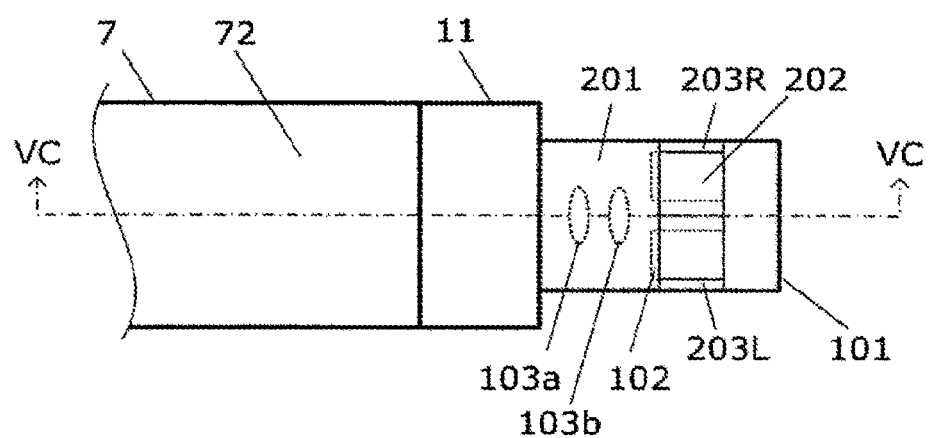
FIG. 5B is a top view schematically illustrating an optical fiber connection structure according to the second embodiment of the present invention.
Figure 5C:
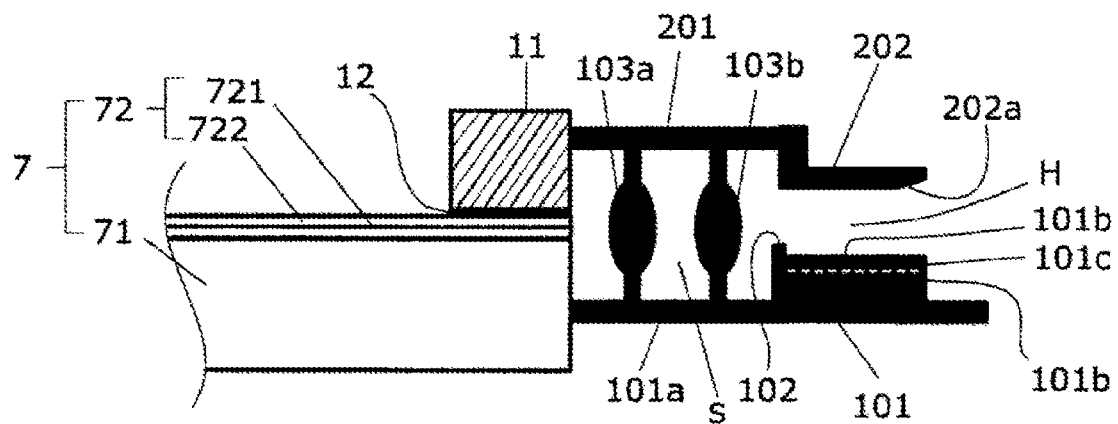
FIG. 5C is a side cross-sectional view illustrating a cross section taken along a line VC-VC in FIG. 5B.

As illustrated in FIGS. 5A and 5C, the support structure formed of the plate members 201, 203R, and 203L constitutes, together with the connection end surface of the optical waveguide device 7, the fiber support member 101, and the plate member 202, a housing S configured to cover the periphery of the lenses 103a and 103b along the optical axis and house the lenses 103a and 103b. A portion of the housing S to be connected to the end surface of the optical waveguide device 7 is open.

In the optical fiber connection structure 2 according to the second embodiment, the support structure formed of the fiber support member 101, the plate members 201, 203R and 203L, and the plate member 202 mounted on the guide portion 101b constitute an optical fiber guide structure 20. In the optical fiber guide structure 20, the interior of a structural body that forms the lens housing S is an air layer. Because of this, after the structural body is formed by curing a light curing resin by stereolithography or the like, an uncured resin in the structural body needs to be dissolved and discharged to the outside of the structural body. To do so, for example, a guide hole H for fiber insertion, which will be described later, formed by the guide portion 101b and the plate member 203 may be used as a relief structure for the uncured resin.

In a case where it is difficult to remove the uncured resin, a through-hole, a gap, or the like may be provided in a part of the structural body that forms the lens housing without making the lens housing be a completely closed space. After removing the uncured resin, by making the through-hole, gap, or the like, which is provided in part of the structural body, be filled with an adhesive or the like, it is possible to make the lens housing be a completely closed space after the insertion of the fiber.

Figure 5D:
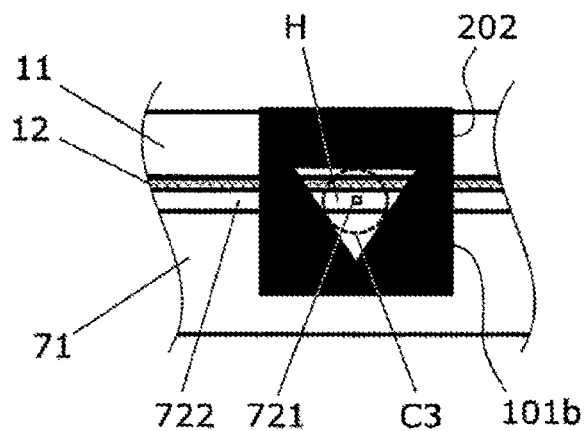
FIG. 5D is a front view illustrating a configuration of a guide portion of an optical fiber connection structure according to the second embodiment of the present invention.

The plate member 202 mounted on the guide portion 101b of the fiber support member 101 substantially forms, together with the V groove low formed on the top surface of the guide portion 101b, the guide hole H, into which the optical fiber is inserted, and constitutes, together with the guide portion 101b, the optical fiber guide structure 20 configured to act as a guide portion for guiding the optical fiber. In the optical fiber guide structure 20 of the optical fiber connection structure 2 according to the second embodiment, as illustrated in FIG. 5D, the guide hole H has a triangular cross section perpendicular to the longitudinal direction thereof, and is formed so that the diameter of an inscribed circle C3 thereof is substantially equal to or slightly larger than the outer diameter of the optical fiber 60 to be inserted thereinto. For the sake of simplicity, the stopper 102, the lenses 103a and 103b, and the like are omitted and not illustrated in FIG. 5D.

Meanwhile, the stopper 102 is provided adjacent to the guide portion 101b at the lens-side end portion of the optical fiber guide hole H, that is, near the V groove on the side of the guide portion 101b facing the optical waveguide device 7. Since the stopper 102 is in contact with an end surface of the clad 602 of the inserted optical fiber 60 (with the end surface or a chamfered portion of the clad 602 in the case where the leading end surface of the optical fiber 60 is chamfered, as illustrated in FIG. 5E), the movement in the axial direction of the optical fiber 60 is restricted and a predetermined gap is provided between the end surface of the optical fiber 60 and the lens 103b.

Figure 5E:
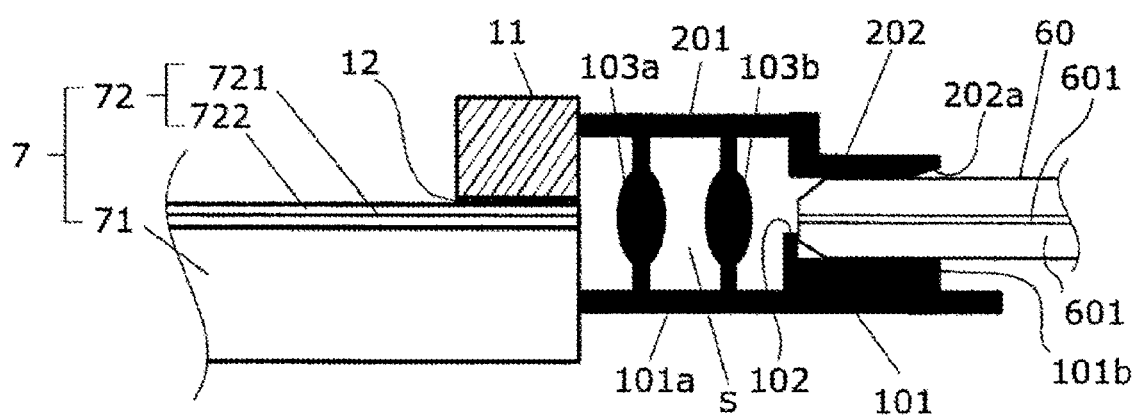
FIG. 5E is a side cross-sectional view illustrating an optical fiber connection structure according to the second embodiment of the present invention.

FIG. 5E illustrates a state in which the optical fiber 60 is inserted into the optical fiber guide structure 20.

As illustrated in FIG. 5D, the optical fiber guide structure 20 is disposed in such a manner that the center of the inscribed circle C3 of the guide hole H, into which the optical fiber 60 is inserted, is coincident with the optical axis of the core 721 of the optical waveguide device 7 and the optical axis of the optical fiber 60. Thus, by inserting the optical fiber 60 into the guide hole H, the optical waveguide device 7 and the optical fiber 60 can be optically connected.

At this time, since the end surface of the optical fiber 60 makes contact with the stopper 102, the distance between the lens 1o3b and the optical fiber 60 is uniquely determined. The light beam outputted from the core 721 of the optical waveguide device 7 and/or the core 601 of the optical fiber 60 expands as the light beam travels away from each of the end surfaces. To address this, the effective diameter of each of the lenses 103a and 103b is set to be a diameter necessary to prevent the occurrence of beam vignetting. Furthermore, the structure is designed so that there occurs no beam vignetting caused by the fiber support member 101 and other surrounding structural objects.

As illustrated in FIG. 5E, chamfering is performed on the leading end of the optical fiber 60 to facilitate insertion of the optical fiber 60 into the optical fiber guide structure 20. Further, as illustrated in FIGS. 5C and 5E, in order to make the inscribed circle diameter near an insertion opening of the guide hole H larger than other portions, one end portion of the plate member 202, an end portion of the guide portion 101b, or the like is formed to have a tapered structure 202a, thereby making it possible to further facilitate the insertion of the optical fiber 60.

Modification Example of Second Embodiment

Figure 6:
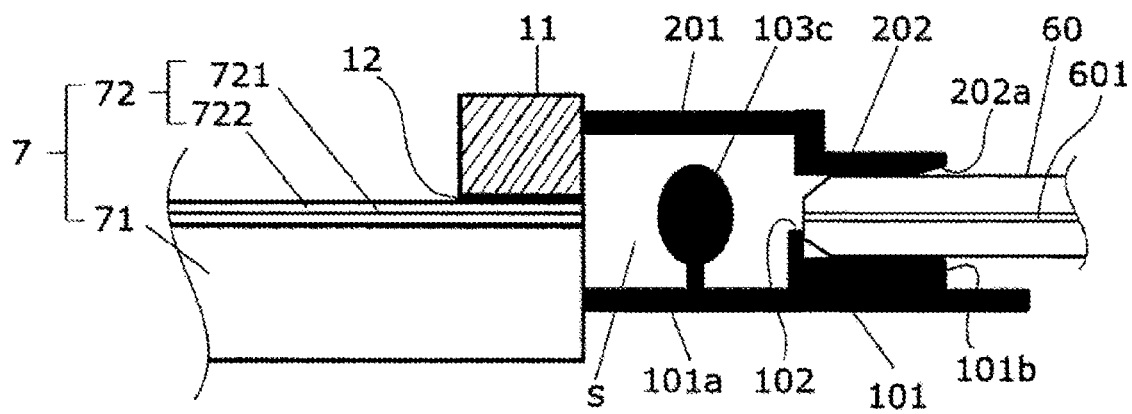
FIG. 6 is a side cross-sectional view illustrating a modification example of an optical fiber connection structure according to the second embodiment of the present invention.

As discussed above, as the optical fiber connection structure according to the second embodiment, an example is described in which the two lenses 103a and 103b are housed in the lens housing S, as illustrated in FIGS. 5A to 5E. However, the present invention is not limited to a two-lens system, and, for example, a four-lens system, a one-side convex lens, a concave lens, and the like may be appropriately combined when constituting a lens system such as a single-lens system formed of a single biconvex lens 103c as illustrated in FIG. 6. In addition, various functional elements such as a wavelength plate may be integrated inside the lens housing S.

Figure 7A:
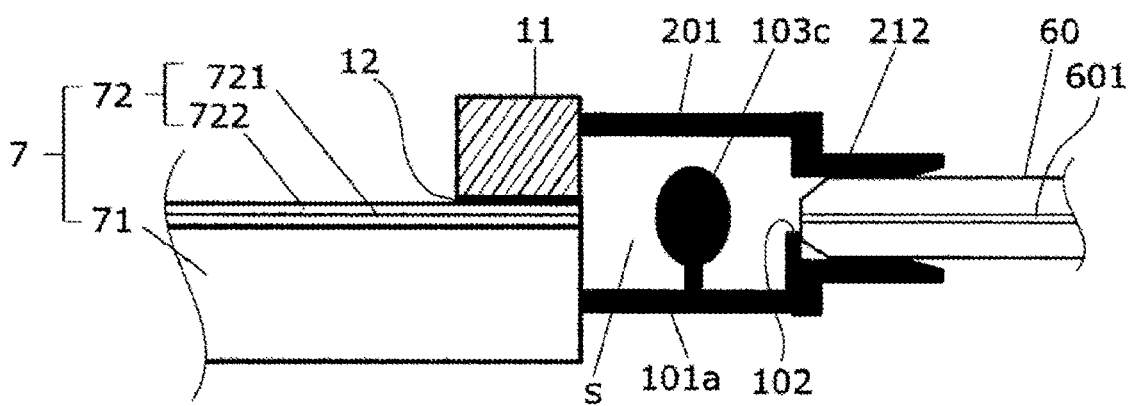
FIG. 7A is a side cross-sectional view illustrating an example of a guide portion in an optical fiber connection structure according to the second embodiment of the present invention.
Figure 7B:
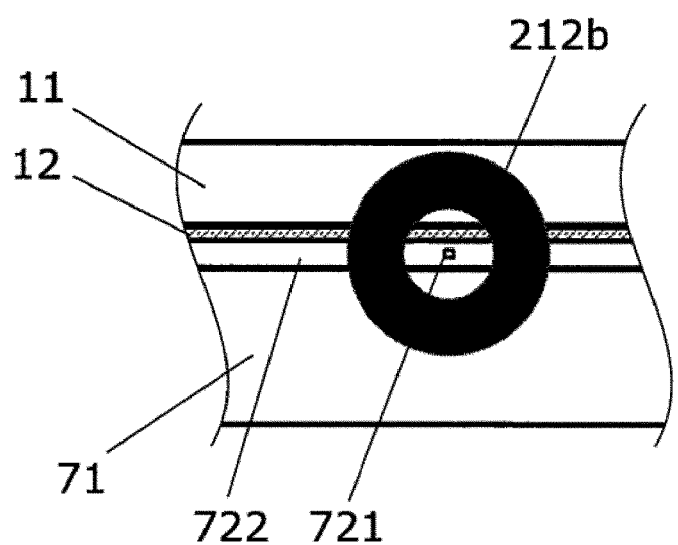
FIG. 7B is a front view illustrating an example of a guide portion in an optical fiber connection structure according to the second embodiment of the present invention.
Figure 7C:
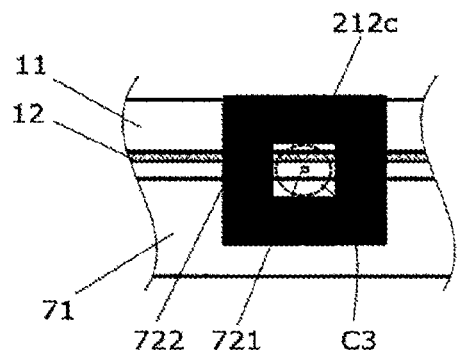
FIG. 7C is a front view illustrating another example of a guide portion in an optical fiber connection structure according to the second embodiment of the present invention.
Figure 7D:
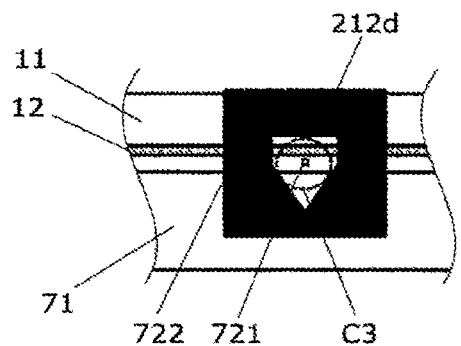
FIG. 7D is a front view illustrating another example of a guide portion in an optical fiber connection structure according to the second embodiment of the present invention.
Figure 7E:
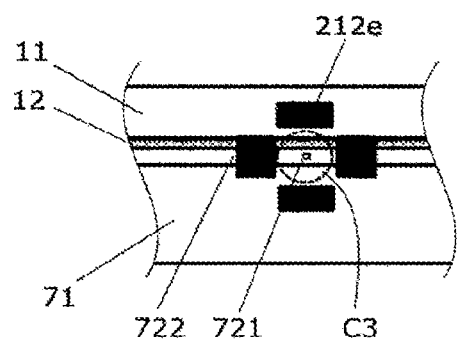
FIG. 7E is a front view illustrating another example of a guide portion in an optical fiber connection structure according to the second embodiment of the present invention.

Regarding the optical fiber connection structure 2 according to the second embodiment, a configuration is described above in which the cross section perpendicular to the longitudinal direction of the guide hole H is formed in a triangular shape, but in the present invention, the cross-sectional shape of the guide hole H may take any configuration as along as the structure enables insertion and positioning of the optical fiber. For example, by appropriately selecting the shape of the groove formed on the guide portion 101b, and constituting a guide portion 212 configured to guide the optical fiber 60 by a cylindrical member as illustrated in FIG. 7A, the cross-sectional shape of the guide hole H may be any of a circle (212b), a square (212c), and a pentagon (212d), as illustrated in FIGS. 7B to 7D, respectively. At this time, the guide portion 212 is formed in such a manner that the diameter of the inscribed circle C3 of the guide hole H is substantially equal to or slightly larger than the outer diameter of the optical fiber 60 to be inserted. Further, as illustrated in FIG. 7E, the guide portion may be formed by disposing a plurality of beam structures 212e, which are discontinuous in a circumferential direction, so as to effectively form an inscribed circle. In this case as well, the guide portion is formed in such a manner that the diameter of the inscribed circle C3 is substantially equal to or slightly larger than the outer diameter of the optical fiber 60 to be inserted.

The outer peripheral structure of the structural body that forms the lens housing S is illustrated in which a parallelepiped structure having a rectangular cross section perpendicular to the longitudinal direction is exemplified. However, needless to say, the cross section may be polygonal, and the shape thereof may be optionally designed. In other words, similarly to the guide hole H described above, a truss structure may be employed in which a large number of through-holes and the like are provided without making a completely closed space.

Effects of Second Embodiment

With the optical fiber connection structure according to the second embodiment, similarly to the first embodiment, a highly accurate fiber guide structure with submicron accuracy can be formed by being drawn directly on the optical waveguide end surface. Furthermore, the above optical fiber connection structure may be used as a guide to position the optical fiber and the optical axis, thereby making it possible for the fiber to be connected on the board, in the package, or the like with ease.

By incorporating the lenses in the lens housing S, the beam diameter can be converted and connected so that the mode field of the core of the optical waveguide device and the mode field of the core of the optical fiber are matched. Accordingly, even when an axial deviation occurs due to the clearance of the guide portion, the connection can be made without a large optical loss, and thus an optical connection with low loss and high axial-deviation tolerance can be achieved between the optical waveguide device and the optical fiber.

Moreover, since the support structure that constitutes the lens housing S is provided, and the lenses are housed in the lens housing S, it is possible to prevent an increase in loss due to an incident in which dust enters and stays on the lens surface, the waveguide end surface or the fiber end surface, or the dust enters between the waveguide and the lens, an increase in loss due to the condensation of moisture on the lens surface, or the like, thereby making it possible to achieve a highly reliable connection.

Third Embodiment

A third embodiment of the present invention will be described below with reference to FIGS. 8A and 8B.

Figure 8A:
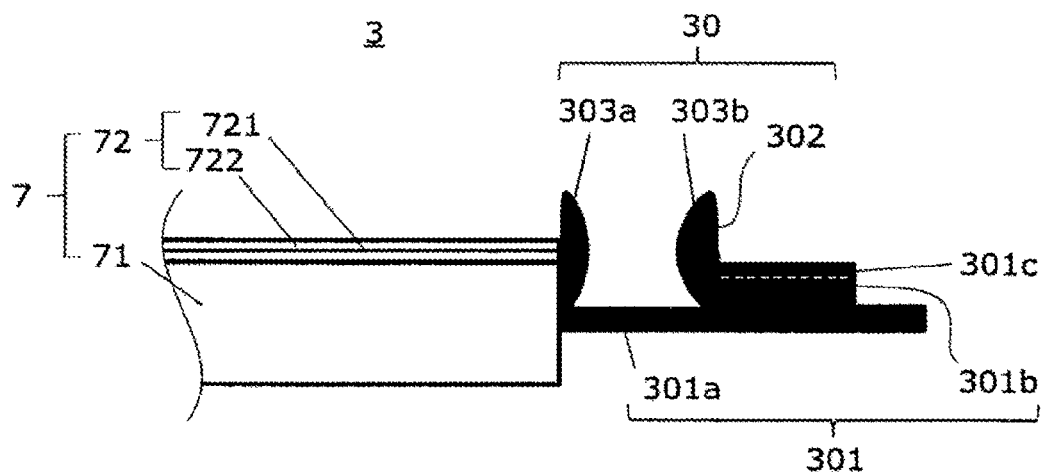
FIG. 8A is a side cross-sectional view illustrating an optical fiber connection structure according to a third embodiment of the present invention.

An optical fiber connection structure 3 according to the third embodiment includes, as illustrated in FIG. 8A, two one-side convex lenses 303a and 303b, which constitute a two-lens system. The first lens 303a is connected to the end surface of the optical waveguide device 7 without an air layer interposed therebetween. The second lens 303b is connected to the end surface of the optical fiber 60 without an air layer interposed therebetween. Between the first lens 303a and the second lens 303b, there is a layer, for example, an air layer, having a refractive index lower than that of a light curing resin constituting these lenses.

A fiber support member 301 includes a connection portion 301a to be connected to the end surface of the optical waveguide device 7, and a guide portion 301b configured to guide the optical fiber 60. On a top surface of the guide portion 301b, there is provided a groove 301c able to accommodate the cylindrical fiber 60.

A flat plane of the second lens 303b facing the guide portion 301b acts as a stopper 302 and restricts the movement in the axial direction of the optical fiber 60 mounted on the guide portion 301b.

Figure 8B:
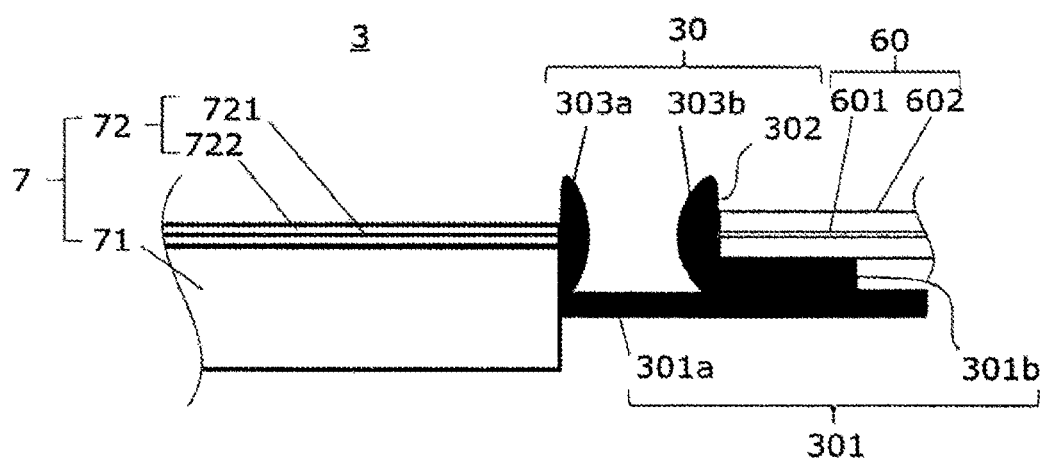
FIG. 8B is a side cross-sectional view illustrating an optical fiber connection structure according to the third embodiment of the present invention.

FIG. 8B illustrates a state in which the optical fiber 60 is mounted in the optical fiber connection structure 3 according to the third embodiment. The end surface of the optical fiber 60 is in contact with the flat plane of the second lens 303b, which acts as the stopper 302, without a gap therebetween.

In the case where a gap is generated between the first lens 303a and the end surface of the optical waveguide device 7 or between the second lens 303b and the end surface of the optical fiber 60, the gap may be filled with a refractive index matching agent, adhesive, or the like. The shape of each of the first lens 303a and the second lens 303b may employ any shape such as a nonlinear shape, a Fresnel lens shape, or the like, and may be suitably selected so that the loss is lowest.

By employing the structure described above, according to the optical fiber connection structure 3 according to the third embodiment, the same effects as those of the first and second embodiments can be exhibited. In addition, the number of interfaces between the light curing resin and the air can be reduced, which makes it possible to reduce a connection loss due to reflection and the like.

Modification Example of Third Embodiment

Figure 9A:
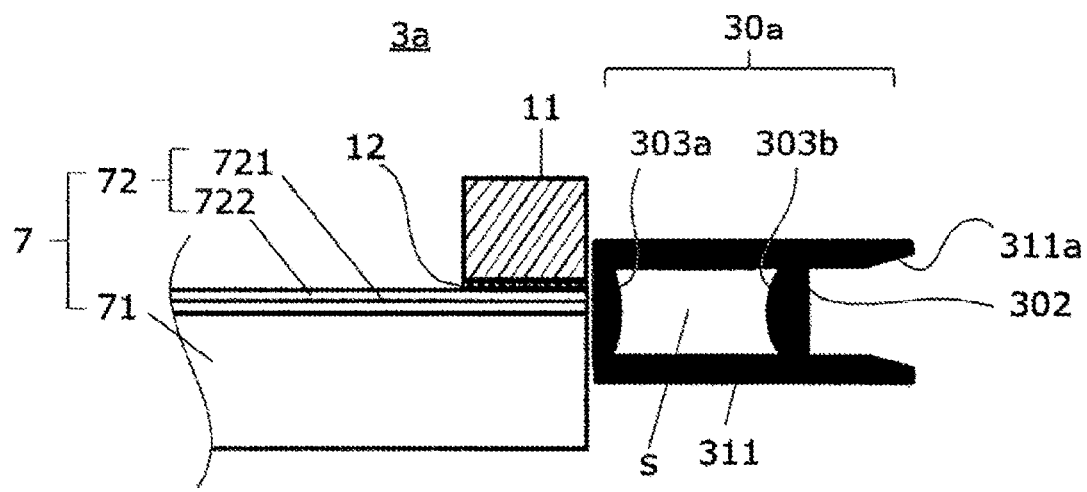
FIG. 9A is a side cross-sectional view illustrating a modification example of an optical fiber connection structure according to the third embodiment of the present invention.
Figure 9B:
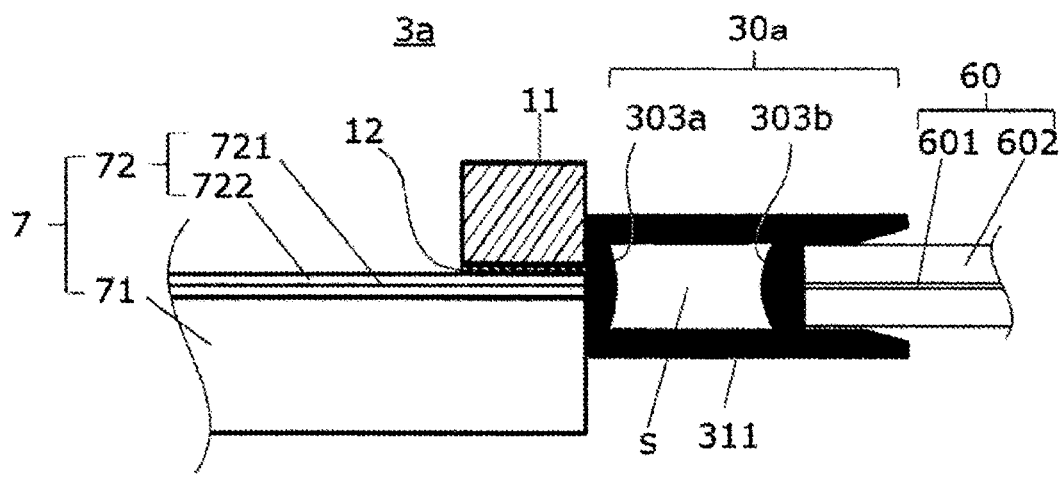
FIG. 9B is a side cross-sectional view illustrating a modification example of an optical fiber connection structure according to the third embodiment of the present invention.

A modification example of an optical fiber connection structure according to the third embodiment is illustrated in FIGS. 9A and 9B.

An optical fiber connection structure 3a according to the present modification example is the same as the optical fiber connection structure 3 according to the above-described third embodiment in a point that a lens system is constituted by two one-side convex lenses 303a and 303b, and a flat surface of the first lens 30a and a flat surface of the second lens 303b are connected to the end surface of the optical waveguide device 7 and the end surface of the optical fiber 60, respectively, without an air layer interposed therebetween. Meanwhile, as illustrated in FIGS. 9A and 9B, the optical fiber connection structure 3a according to the present modification example further includes the reinforcement plate 11 on the optical waveguide layer 72 of the optical waveguide device 7, and includes, in place of the guide portion 301b of the optical fiber connection structure 3 according to the above-described third embodiment, a guide member 311, one end of which is joined to the connection end surface of the optical waveguide device 7 and a side surface of the reinforcement plate 11. The other end side of the guide member 311, which is cylindrical, acts as a guide portion for guiding the optical fiber 60. The first lens 303a and the second lens 303b are housed in the guide member 311, which is cylindrical. Of these lenses, the flat plane of the second lens 303b serves as a stopper structure for the optical fiber.

By housing the lenses inside the guide member 311 by employing the above-discussed configuration, it is possible to reduce the risk of an increase in loss due to an incident in which dust enters and stays on the lens surface, the waveguide end surface or the fiber end surface, or the dust enters between the waveguide and the lens, an increase in loss due to the condensation of moisture on the lens surface, and the like, thereby making it possible to achieve a highly reliable connection.

Fourth Embodiment

Figure 10:
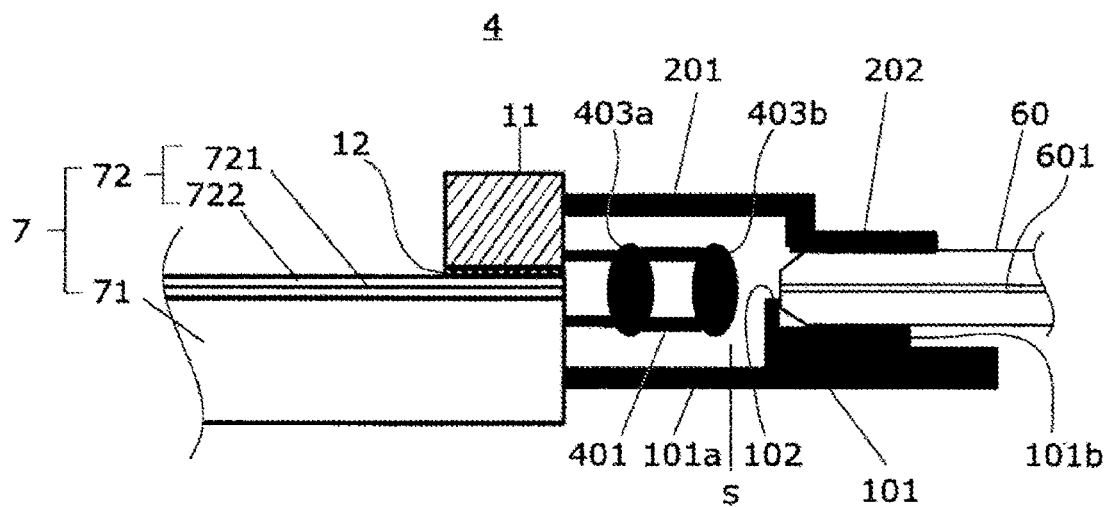
FIG. 10 is a side cross-sectional view illustrating an optical fiber connection structure according to a fourth embodiment of the present invention.

Next, a fourth embodiment of the present invention will be described with reference to FIG. 10.

In the first embodiment and the second embodiment described above, the fiber support member 101, which is to be connected to the connection end surface of the optical waveguide device 7 and in which the optical fiber 60 is mounted or supported, supports the lenses 103a and 103b. However, as illustrated in FIG. 10, an optical fiber connection structure 4 according to the fourth embodiment includes a lens support member 401 independent of the fiber support member 101, and the fourth embodiment differs from the first embodiment and the second embodiment described above with respect to a point that the lens support member 401 supports lenses 403a and 403b.

The lens support member 401 is a beam or cylindrical structural object. The size and arrangement thereof are set in such a manner that beam vignetting associated with the lens support member 401 does not occur. One end of the lens support member 401 is joined to the connection end surface of the optical waveguide device 7 and the side surface of the reinforcement plate 11.

In the fourth embodiment, the fiber support member 101 and the lens support member 401 are independent of each other and connected to the connection end surface of the optical waveguide device 7 and the side surface of the reinforcement plate 11.

The fourth embodiment is the same as the above-described first and second embodiments with respect to a point that the fiber support member 101 includes the connection portion 101a to be connected to the end surface of the optical waveguide device 7 and the guide portion 101b for guiding the optical fiber 60, and a point that the stopper 102 is provided adjacent to the connection portion (101a).

Modification Example of Fourth Embodiment

Figure 11:
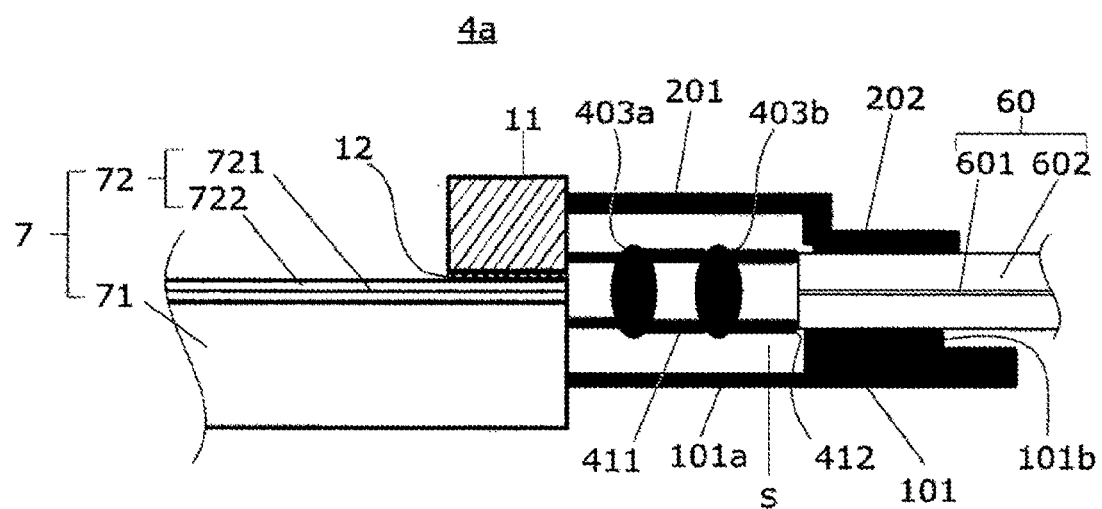
FIG. 11 is a side cross-sectional view illustrating a modification example of an optical fiber connection structure according to the fourth embodiment of the present invention.

As illustrated in FIG. 11, in an optical fiber connection structure 4a according to a modification example of the fourth embodiment, in addition to a lens support member 411 supporting the lenses 403a and 4o3b, a leading end portion 412 of the lens support member 411 serves as a stopper for the optical fiber 60. In other words, in the modification example of the fourth embodiment, the stopper is provided on the lens support member 411 (not on the fiber support member 101).

Effects of Fourth Embodiment

In the fourth embodiment and the modification example thereof, the lenses 403a and 403b are supported by the lens support members 401 and 411, which are independent of the fiber support member 101. Accordingly, it is possible to prevent stress, displacement, or the like applied to the optical fiber guide structure from affecting the lenses when the optical fiber 60 is mounted on or inserted into the fiber support member 101, thereby making it possible to achieve a more highly reliable connection with lower loss.

Fifth Embodiment

Next, a fifth embodiment of the present invention will be described with reference to FIGS. 12A to 12D.

In an optical fiber connection structure 5 according to the fifth embodiment, similarly to the above-described fourth embodiment and the modification example thereof, a fiber support member which is to be connected to the connection end surface of the optical waveguide device 7 and mounts or supports the optical fiber, and the lens support member 411 configured to support the lenses 403a and 403b are provided independently from each other.

The fiber support member is constituted by a plurality of beam structural bodies 50 each formed of an elastically deformable material. The beam structural bodies 50 each include a beam 501 with one end thereof to be connected to the connection end surface of the optical waveguide device 7 or the side surface of the reinforcement plate 11, and a plate spring 502 extending along the longitudinal direction from the other end side of the beam 501. The beam 501 has a higher rigidity than the plate spring 502.

Figure 12A:
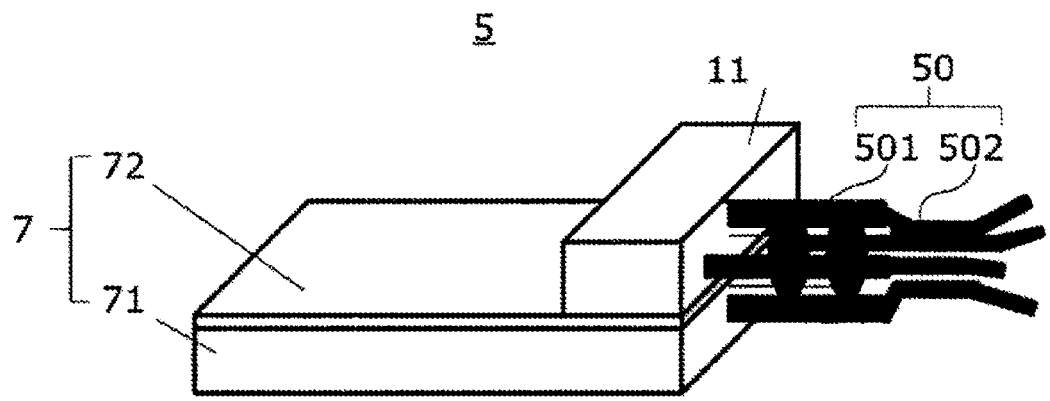
FIG. 12A is a perspective view schematically illustrating an optical fiber connection structure according to a fifth embodiment of the present invention.
Figure 12B:
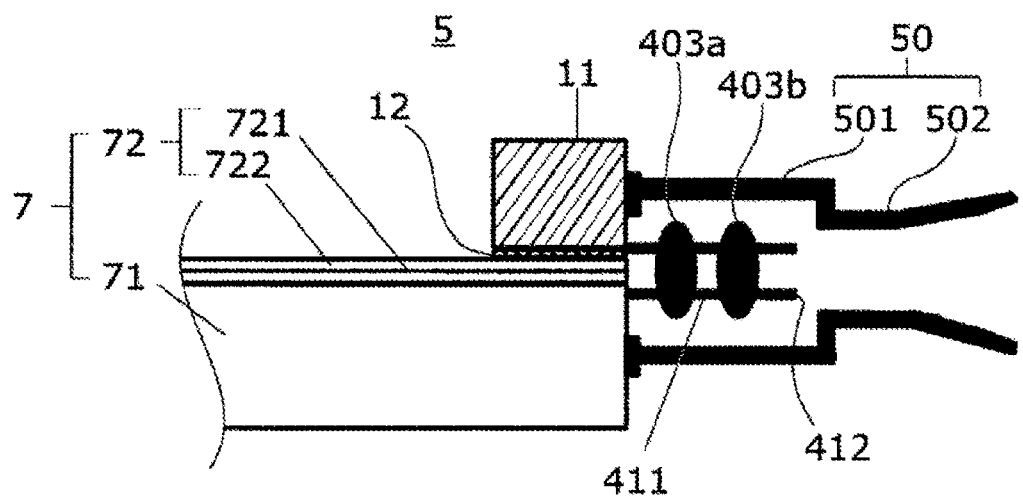
FIG. 12B is a side cross-sectional view schematically illustrating an optical fiber connection structure according to the fifth embodiment of the present invention.
Figure 12C:
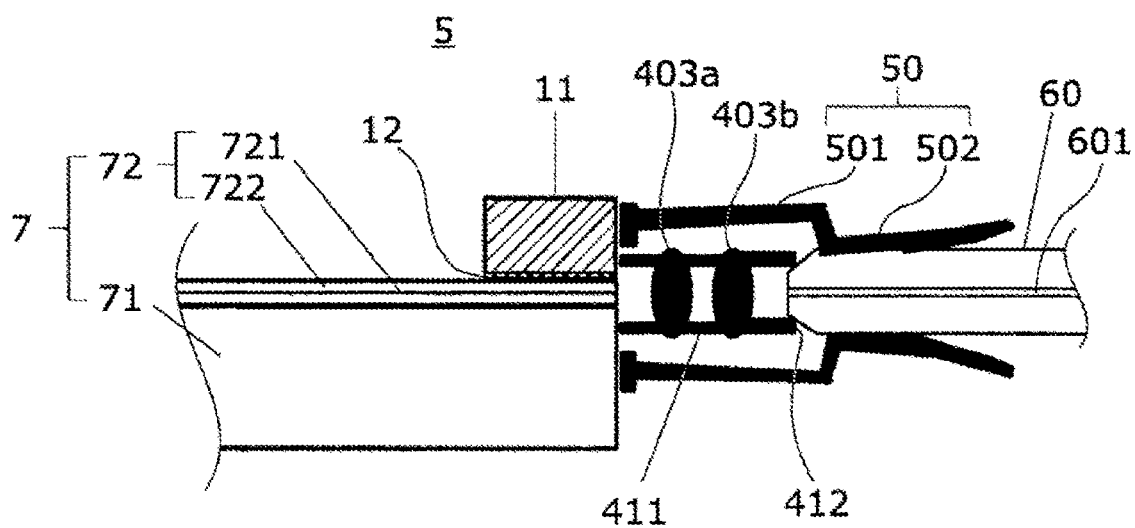
FIG. 12C is a side cross-sectional view schematically illustrating an optical fiber connection structure according to the fifth embodiment of the present invention.

The beam structural bodies 50 are each made of a light curing resin and formed directly on the connection end surface of the optical waveguide device 7 or on the side surface of the reinforcement plate 11. The plate springs 502 of these beam structural bodies 50 do not necessarily form a cylindrical portion that is closed in the circumferential direction of the optical fiber 60, and as illustrated in FIG. 12C, the plate springs 502 of the plurality of beam structural bodies 50 cooperate with each other to form a guide portion configured to guide the optical fiber 60.

The leading end portion 412 of the lens support member 411 serves as a stopper.

Figure 12D:
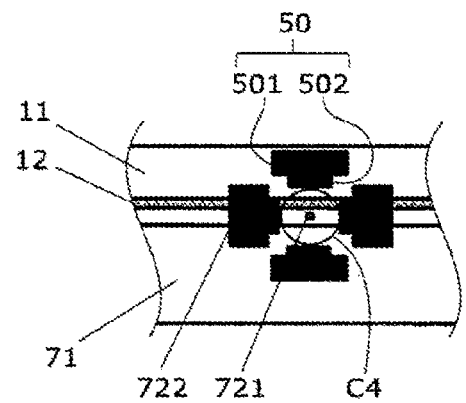
FIG. 12D is a front view schematically illustrating an optical fiber connection structure according to the fifth embodiment of the present invention.

In the optical fiber connection structure 5 according to the fifth embodiment, the fiber support member described above is formed by erecting four beam structural bodies 50 at point-symmetrical positions about the core 721 of the optical waveguide device 7 on the connection end surface of the optical waveguide device 7 and the side surface of the reinforcement plate 11. At this time, as illustrated in FIG. 12D, the beam structural bodies 50 are disposed in such a manner that the diameter of an inscribed circle C4 in contact with inner wall surfaces of the plate springs 502 of the four beam structural bodies 50 is slightly smaller than the outer diameter of the optical fiber 60 to be inserted.

Thus, when inserting the optical fiber 60 into the guide portion formed of the beam structural bodies 50, each of the beam structural bodies 50 elastically deforms, and the diameter of the inscribed circle C4 thereof is expanded, so that the optical fiber 60 is inserted.

By employing the above-discussed configuration, with the optical fiber connection structure 5 according to the fifth embodiment, an additional effect is obtained in which clearance between the optical fiber 60 and the plate springs 502 of the beam structural bodies 50 constituting the guide portion is eliminated, so that a connection with low loss can be achieved.

The length, thickness, and the like of the plate spring 502 may be set appropriately in such a manner that the Young's modulus of the plate spring 502 formed of a light curing resin becomes suitable in accordance with the joining strength between the optical waveguide device 7 and the beam structural body 50, the magnitude of a force received from the optical fiber 60 to be inserted, and the like.

Modification Examples of Fifth Embodiment

Various modification examples are conceivable as a method for eliminating the clearance while taking advantage of elastic deformation of a part of the member constituting the guide portion.

Figure 13A:
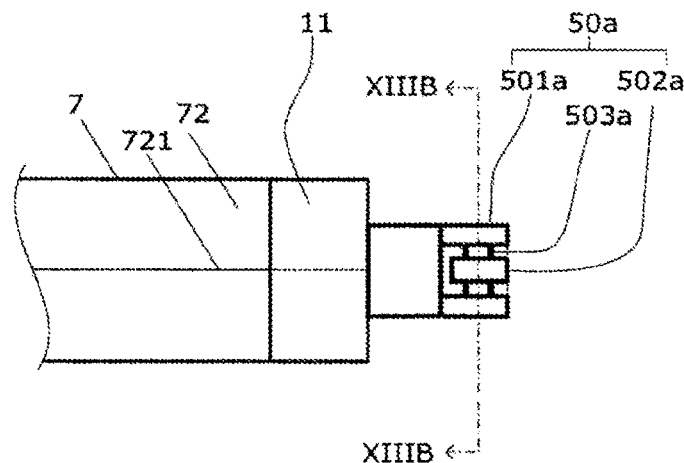
FIG. 13A is a top view schematically illustrating a first modification example of an optical fiber connection structure according to the fifth embodiment of the present invention.
Figure 13B:
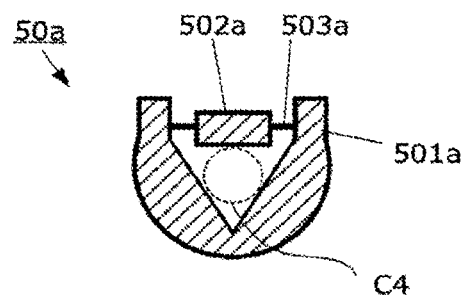
FIG. 13B is a cross-sectional view illustrating a cross section taken along a line XIIIB-XIIIB in FIG. 13A.

First, a first modification example is illustrated in FIGS. 13A to 13C. In the first modification example, the guide portion of the optical fiber guide structure is configured to include a cylindrical member 501a, which is formed in a cylindrical shape and in a part of which a cutout is formed along the longitudinal direction, a contact portion 502a, which is provided inside the cutout and makes contact with the side surface of the optical fiber 60 when the optical fiber 60 is inserted, and a spring member 503a set between the cylindrical member 501a and the contact member 502a.

As illustrated in FIGS. 13A and 13B, the spring member 503a set between the cylindrical member 501a and the contact member 502a is provided along a direction intersecting the longitudinal direction of the cylindrical member 501a, and the contact member 502a is not directly connected to the cylindrical member 501a in the longitudinal direction.

The description of the present modification example is given in which a cutout is provided in a part of the cylindrical member 501a; however, instead of the cutout, a through-hole that is open to a wall surface of the cylindrical member 501a may be provided.

In at least a part of the contact member 502a in the longitudinal direction, the diameter of an inscribed circle C4 in contact with an inner wall of the cylindrical member 501a and an inner side surface of the contact member 502a in a plane perpendicular to the longitudinal direction is set to be smaller than the outer diameter of the optical fiber 60 to be inserted.

Accordingly, in the state in which the optical fiber 60 is inserted, a force is applied to the contact member 502a from the optical fiber 60 toward the outside in the radial direction accompanying the insertion of the optical fiber 60, so that the spring member 503a elastically deforms in a direction in which the diameter of the inscribed circle C4 is expanded, thereby making it possible to insert the fiber. After the insertion of the optical fiber 60, a plurality of the spring members 503a cooperate with each other to support the optical fiber 60 in a state in which a compressive stress in the radial direction of the optical fiber 60 is applied to the optical fiber 60 via the contact member 502a, whereby clearance between the optical fiber 60 and the optical fiber guide structure may be eliminated. This allows the optical axis of the optical fiber 60 to be uniquely defined.

The contact member 502a is not directly coupled to the cylindrical member 501a erected on the connection end surface of the optical waveguide device 7 in the longitudinal direction. With this structure, the following effects are further exhibited.

That is, because the contact member 502a is coupled to the cylindrical member 501a by the spring member 503a provided in a direction orthogonal to the longitudinal direction, and is not directly coupled to the cylindrical member 501a in the longitudinal direction, the stress accompanying the insertion of the optical fiber 60 is not directly transmitted from the contact member 502a to the cylindrical member 501a. Accordingly, even when the diameter of the inscribed circle C4, which is inscribed with respect to the cylindrical member 501a and the contact member 502a in a plane perpendicular to the longitudinal direction including the cylindrical member 501a, is set to be smaller than the outer diameter of the optical fiber 60, the risk of the joining portion between the cylindrical member 501a and the connection end surface of the optical waveguide 7 being separated due to the stress accompanying the insertion of the optical fiber 60 may be reduced.

Figure 14:
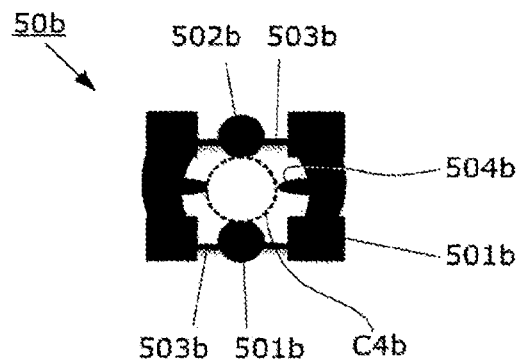
FIG. 14 is a front view schematically illustrating a second modification example of an optical fiber connection structure according to the fifth embodiment of the present invention.

As a second modification example, for example, as illustrated in FIG. 14, an optical fiber guide structure Sob is conceivable in which a plurality of suspension bridge structures each constituted by a spring member 503b and a contact member 502b are provided at symmetrical positions across the axis of the cylindrical member 501b. At this time, a projection 504b configured to support the optical fiber 60 may be provided on the inner wall of the cylindrical member 501b. In a plane passing through the contact member 502b and perpendicular to the longitudinal direction of the optical fiber guide structure 50b, the diameter of an inscribed circle C4b in contact with an inner surface of the cylindrical member 501b and an inner surface of the contact member 502b is set to be smaller than the outer diameter of the optical fiber 60 to be inserted.

The optical fiber guide structure Sob illustrated in FIG. 14 is an example in which two contact members 502b are disposed at symmetrical positions across the axis of the cylindrical member 501a. Furthermore, three or more contact members 502b may be disposed at rotationally symmetrical positions with respect to the axis, and each of the contact members 502b may be connected to the cylindrical member 501b by the spring member 503b.

Figure 15A:
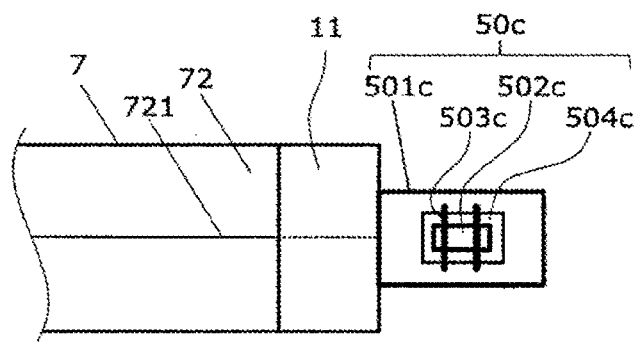
FIG. 15A is a top view schematically illustrating a third modification example of an optical fiber connection structure according to the fifth embodiment of the present invention.
Figure 15B:
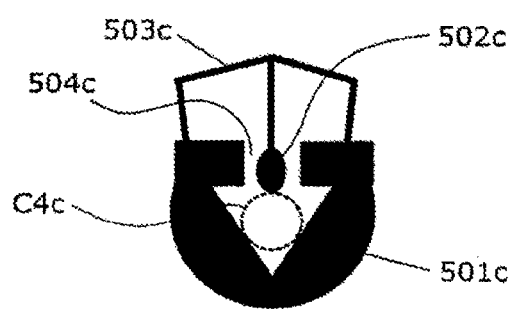
FIG. 15B is a front view schematically illustrating the third modification example of an optical fiber connection structure according to the fifth embodiment of the present invention.

A third modification example is illustrated in FIGS. 15A and 15B. The basic configuration of an optical fiber guide structure 50c according to the third modification example is the same as the configuration of the above-described second modification example with respect to a point that a contact member 502c is disposed in a through-hole 504c formed in a part of a side wall of a cylindrical member 501c. However, in the third modification example, a spring member 503c having a beam structure is provided on an outer wall of the cylindrical member 501c, and the contact member 502c is supported by the spring member 503c. As illustrated in FIG. 15B, the contact member 502c is disposed in such a manner that a part thereof projects into the through-hole that is formed inside the cylindrical member 501c and that has a substantially triangular cross section. At this time, the spring member 503c and the contact member 502c are provided in such a manner that the diameter of an inscribed circle C4c in contact with an inner wall of the contact member 502c and an inner wall of the cylindrical member 501c is smaller than the outer diameter of the optical fiber 60 in a plane perpendicular to the longitudinal direction of the optical fiber guide structure 50c.

As a result, when the optical fiber 60 is inserted, the side surface of the optical fiber 60 is brought into contact with the contact member 502c, and the spring member 503c is elastically deformed by receiving a force from the optical fiber 60; thus, a connection can be made while eliminating clearance because the optical fiber 60 is inserted.

A plurality of suspension bridge structures each constituted by the spring member 503c having a beam structure and the contact member 502c may be present along the circumference of the cylindrical member 501c.

Figure 16A:
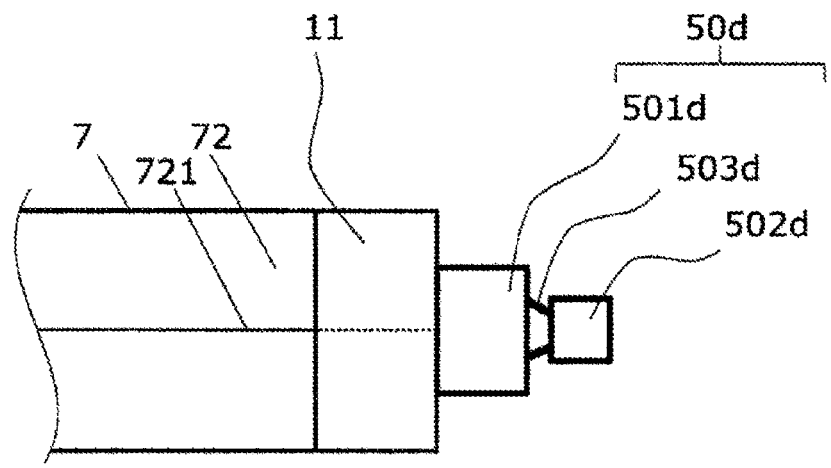
FIG. 16A is a top view schematically illustrating a fourth modification example of an optical fiber connection structure according to the fifth embodiment of the present invention.
Figure 16B:
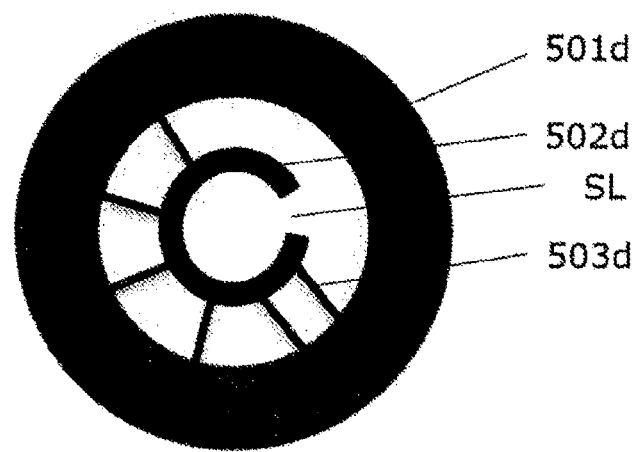
FIG. 16B is a front view schematically illustrating the fourth modification example of an optical fiber connection structure according to the fifth embodiment of the present invention.
Figure 17A:
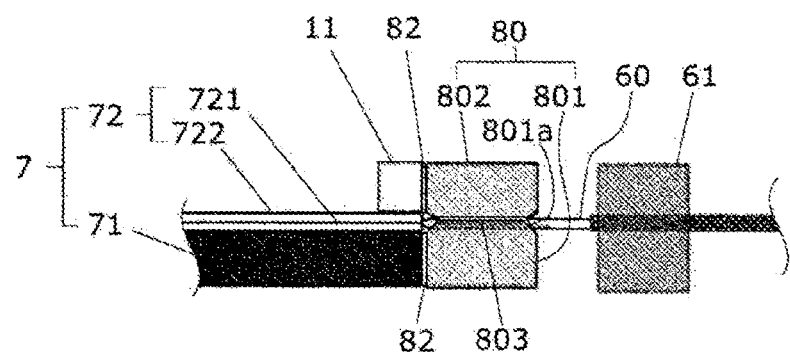
FIG. 17A is a top view schematically illustrating an example of a conventional optical fiber connection structure.
Figure 17B:
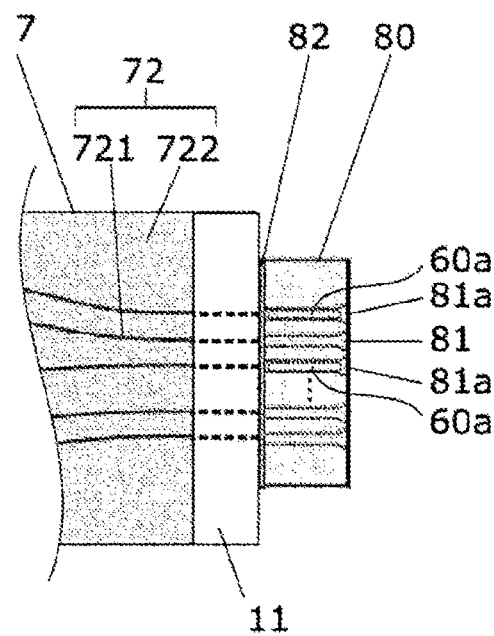
FIG. 17B is a side view schematically illustrating an example of a conventional optical fiber connection structure.

As illustrated in FIGS. 16A and 16B, a fourth modification example is provided with a first cylindrical member 501d, a second cylindrical member 502d, and a coupling member 503d. One end of the first cylindrical member 501d is connected to the connection end surface of the optical waveguide device 7. The second cylindrical member 502d is disposed with the axis thereof coincident with the axis of the first cylindrical member 501d. The coupling member 503d couples the first cylindrical member 501d and the second cylindrical member 502d to each other. The coupling member 503d is, for example, a beam having a plate spring structure. These members, that is, the first cylindrical member 501d, the second cylindrical member 502d, and the coupling member 503d are each formed of an elastically deformable material.

As illustrated in FIG. 16B, the first cylindrical member 501d and the second cylindrical member 502d are both formed in a cylindrical shape. The inner diameter of the second cylindrical member 502d is smaller than the inner diameter of the first cylindrical member 501d as well as the outer diameter of the optical fiber 60 to be inserted. A slit SL is formed along the axial direction in a side surface of the second cylindrical member 502d.

Accordingly, in the second cylindrical member 502d, although the inner diameter thereof is set to be smaller than the outer diameter of the optical fiber 60, the slit SL is provided in the side surface thereof, and the second cylindrical member 502d is formed of an elastically deformable material. Thus, when the optical fiber 60 is inserted therein, the second cylindrical member 502d itself elastically deforms in a direction in which the inner diameter expands, thereby allowing the fiber to be inserted, and after the insertion, the optical fiber 60 is supported in a state in which a compressive stress is applied to the optical fiber 60 in the radial direction of the optical fiber 60. With this, clearance between the optical fiber 60 and the optical fiber guide structure 50d, specifically the second cylindrical member 502d, may be eliminated, and the optical axis of the optical fiber 60 may be uniquely defined.

In the optical fiber guide structure Sod according to the present embodiment, as illustrated in FIGS. 16A and 16B, the second cylindrical member 502d is connected to the first cylindrical member 501d via the coupling member 503d, and the first cylindrical member 501d and the second cylindrical member 502d do not directly contact each other in the longitudinal direction. Accordingly, when the coupling member 503d is constituted by a beam having a plate spring structure, the stress when inserting the optical fiber 60 into the second cylindrical member 502d having the inner diameter smaller than the outer diameter of the optical fiber 60 is not directly transmitted to the first cylindrical member 501d erected on the connection end surface of the optical waveguide device 7 and the side surface of the reinforcement plate 11, and therefore it is possible to reduce the risk of a joining portion between the first cylindrical member 501d and the connection end surface of the optical waveguide device 7 as well as the side surface of the reinforcement plate 11 being separated.

Any of the optical fiber guide structures according to the above-described modification examples can be easily formed by the three-dimensional forming technique described above or the like.

INDUSTRIAL APPLICABILITY

Embodiments of the present invention can be applied to techniques for connecting an optical fiber to an optical waveguide device.

REFERENCE SIGNS LIST

1 Optical fiber connection structure
101 Fiber support member
102 Stopper
103a, 103b Lens
60 Optical fiber
601 Core
602 Clad
7 Optical waveguide device
72 Optical waveguide layer
721 Core

The invention claimed is:

1. An optical fiber connection structure comprising:
a fiber support member configured to support an optical fiber to be optically connected to an optical waveguide device comprising a planar waveguide, wherein the fiber support member is configured to directly contact an end surface of the optical waveguide device and a bottom surface of the optical fiber, and wherein the fiber support member is configured to extend continuously from the end surface of the optical waveguide device to the bottom surface of the optical fiber;
a stopper configured to restrict movement in an axial direction of the optical fiber supported by the fiber support member, wherein the stopper is configured to directly contact an end surface of the optical fiber; and
a lens disposed on an optical axis between the end surface of the optical waveguide device and the end surface of the optical fiber,
wherein the lens is one of a plurality of lenses configured to constitute a two-lens system, and
wherein the lens and a second lens configured to constitute the two-lens system are configured to directly contact the end surface of the optical waveguide device and the end surface of the optical fiber, respectively, wherein the second lens is the stopper.

2. The optical fiber connection structure according to claim 1, wherein:
the fiber support member includes:
a connection portion configured to connect to the end surface of the optical waveguide device; and
a guide portion configured to guide the optical fiber, wherein a top surface of the guide portion is disposed at a higher level than a top surface of the connection portion; and
the stopper and the lens are disposed on the connection portion.

3. The optical fiber connection structure according to claim 1, further comprising:
a lens support member configured to connect to a waveguide substrate of the optical waveguide device and configured to support the lens, wherein the fiber support member includes:
a connection portion configured to connect to the end surface of the optical waveguide device; and
a guide portion configured to guide the optical fiber, wherein the lens is supported by the lens support member, and wherein the stopper is disposed on the connection portion or the lens support member.

4. The optical fiber connection structure according to claim 3, wherein the guide portion forms a guide hole into which the optical fiber is inserted, and wherein a center of an inscribed circle of the guide hole is coincident with an optical axis of the lens.

5. The optical fiber connection structure according to claim 4, wherein the guide portion comprises an elastically deformable material, wherein an inscribed circle of the guide hole is smaller than an outer diameter of the optical fiber to be inserted in at least a first region in a longitudinal direction of the guide hole.

6. The optical fiber connection structure according to claim 1, wherein the fiber support member includes a lens housing inside which the lens is housed and a portion of which to be connected to the end surface of the optical waveguide device is open, and wherein the lens is disposed inside the lens housing.

7. The optical fiber connection structure according to claim 1, wherein:
a layer having a refractive index lower than a refractive index of the plurality of lenses is disposed between the lens and the second lens.

8. A method comprising:
supporting, by a fiber support member, an optical fiber to be optically connected to an optical waveguide device comprising a planar waveguide, wherein the fiber support member directly contacts an end surface of the optical waveguide device and a bottom surface of the optical fiber, and wherein the fiber support member extends continuously from the end surface of the optical waveguide device to the bottom surface of the optical fiber; and
restricting, by a stopper, movement in an axial direction of the optical fiber supported by the fiber support member, wherein a lens is disposed on an optical axis between the end surface of the optical waveguide device and the optical fiber, and wherein the stopper directly contacts an end surface of the optical fiber,
wherein the lens is one of a plurality of lenses configured to constitute a two-lens system,
wherein the lens directly contacts the end surface of the optical waveguide device, and
wherein a second lens of the two-lens system directly contacts the end surface of the optical fiber, wherein the second lens is the stopper.

9. The method according to claim 8, wherein:
the fiber support member includes:
a connection portion configured to connect to the end surface of the optical waveguide device; and
a guide portion configured to guide the optical fiber, wherein a top surface of the guide portion is disposed at a higher level than a top surface of the connection portion; and
the stopper and the lens are disposed on the connection portion.

10. The method according to claim 8, further comprising:
a lens support member configured to connect to a waveguide substrate of the optical waveguide device and configured to support the lens, wherein the fiber support member includes:
a connection portion configured to connect to the end surface of the optical waveguide device; and
a guide portion configured to guide the optical fiber, wherein the lens is supported by the lens support member, and wherein the stopper is disposed on the connection portion or the lens support member.

11. The method according to claim 8, wherein:
a layer having a refractive index lower than a refractive index of the lens and the second lens is disposed between the lens and the second lens.

* * * * *